US012146940B2

(12) United States Patent
Park et al.

(10) Patent No.: US 12,146,940 B2
(45) Date of Patent: Nov. 19, 2024

(54) MEASUREMENT REPORTING FOR BISTATIC AND MULTI-STATIC RADAR IN CELLULAR SYSTEMS

(71) Applicant: QUALCOMM Incorporated, San Diego, CA (US)

(72) Inventors: Seyong Park, San Diego, CA (US); Weimin Duan, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 17/465,680

(22) Filed: Sep. 2, 2021

(65) Prior Publication Data

US 2022/0066014 A1    Mar. 3, 2022

Related U.S. Application Data

(60) Provisional application No. 63/074,413, filed on Sep. 3, 2020.

(51) Int. Cl.
*G01S 13/42* (2006.01)
*G01S 13/00* (2006.01)
*H04W 4/029* (2018.01)

(52) U.S. Cl.
CPC ........... *G01S 13/42* (2013.01); *G01S 13/003* (2013.01); *H04W 4/029* (2018.02)

(58) Field of Classification Search
CPC ............................. G01S 7/023; H04W 4/029
USPC ...................................................... 455/456.1
See application file for complete search history.

(56) References Cited

U.S. PATENT DOCUMENTS

| | | | |
|---|---|---|---|
| 2012/0176266 A1* | 7/2012 | Lee | G01S 7/0235 |
| | | | 342/27 |
| 2018/0348339 A1 | 12/2018 | Lien et al. | |
| 2019/0293781 A1 | 9/2019 | Bolin et al. | |
| 2019/0386728 A1* | 12/2019 | Yoshimura | H04L 5/0023 |
| 2021/0041549 A1* | 2/2021 | Kerner | G01S 7/006 |
| 2022/0030626 A1* | 1/2022 | Bayesteh | H04L 5/0048 |

(Continued)

OTHER PUBLICATIONS

International Search Report and Written Opinion—PCT/US2021/049098—ISA/EPO—Dec. 22, 2021.

*Primary Examiner* — Fabricio R Murillo Garcia
(74) *Attorney, Agent, or Firm* — QUALCOMM Incorporated

(57) ABSTRACT

A radar system may comprise a first wireless communications system Transmission Reception Point (TRP) configured as a transmitter for sending a transmit signal toward a target, a second wireless communications system TRP configured as a receiver for receiving an echo signal corresponding to a reflection of the transmit signal from the target, and a radar server. The first wireless communications system TRP and the second wireless communications system TRP may be part of a cellular communications system. The second wireless communications system TRP may be configured to generate one or more measurement reports containing one or more of delay, Doppler frequency, and/or angle-of-arrival information. The second wireless communications system TRP may be configured to send the one or more measurement reports to an entity within the cellular communications system.

28 Claims, 29 Drawing Sheets

(56) References Cited

U.S. PATENT DOCUMENTS

2022/0225121 A1\* 7/2022 Wanuga ................ H04L 5/0048
2022/0321181 A1\* 10/2022 Hadani ................. H04B 7/024

\* cited by examiner

400

| Name | Value |
| --- | --- |
| Radar Session ID | 12345678 |
| TX Base Station ID | 0003 |
| RX Base Staion ID | 0005 |
| TX/RX Timing Parameters | Link to TX/RX Timing Sub-list |
| Doppler Parameters | Link to Doppler Sub-list |
| Radar Waveform Type | 0 |
| Radar Signal Center Freq | 79 GHz |
| Radar Signal BW | 2 GHz |
| Radar Period | 200 µSec |
| Radar Repetition Factor | 10 |
| LFM Frequency Slope | 100 MHz/µsec |

| Name | Value |
|---|---|
| Radar Session ID | 12345678 |
| TX Transmission Time | 20000.00 μsec |
| Expected Receive Time | 20133.33 μsec |
| Expected Receive Time Uncertainty | [lower bound, upper bound] |

| Name | Value |
|---|---|
| Radar Session ID | 12345678 |
| Expected Doppler Shift | 80,000 m/sec |
| Expected Doppler Spread | 10,000 m/sec |

FIG. 6

FIG. 11A
| Radar Session ID | RS Waveform | Boresight Angle | 3dB Angle |
|---|---|---|---|
| 0001 | PRS | +25° | 10° |
| 0002 | PRS | +25° | 10° |
| 0003 | PRS | +25° | 10° |
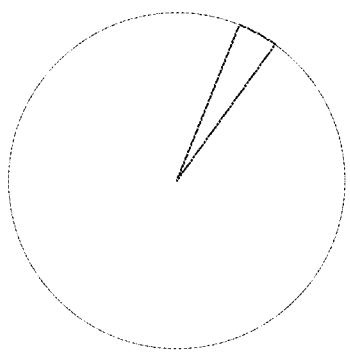
FIG. 11B
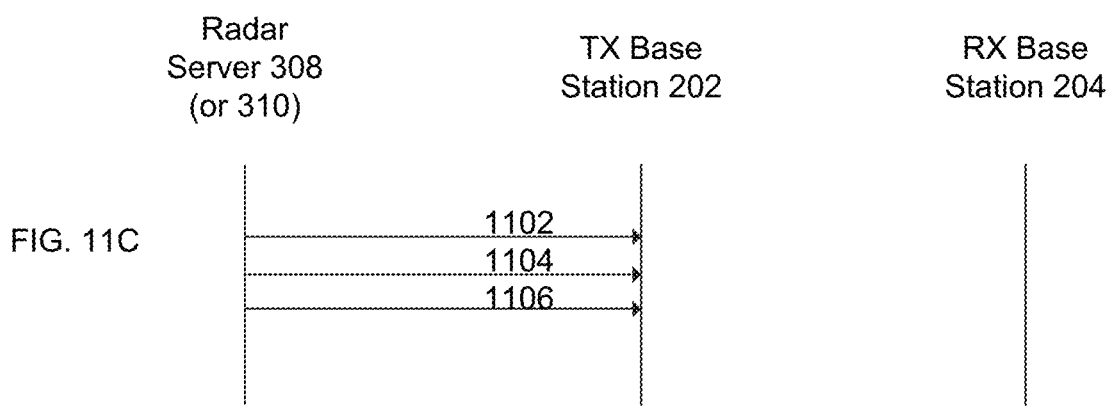
FIG. 11C FIG. 12A
| Radar Session ID | RS Waveform | Boresight Angle | 3dB Angle |
|---|---|---|---|
| 0001 | PRS | -35° | 10° |
| 0002 | PRS | -45° | 10° |
| 0003 | PRS | -55° | 10° |
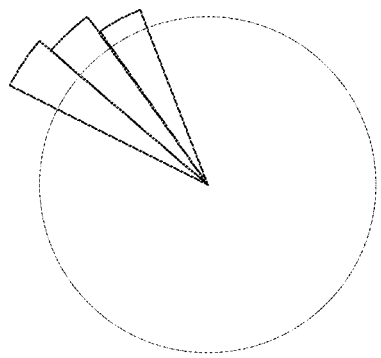
FIG. 12B
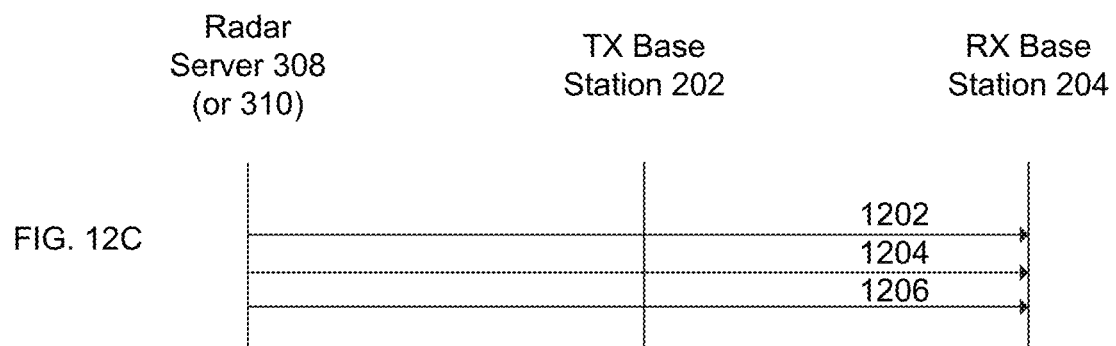
FIG. 12C FIG. 13A
| Radar Session ID | RS Waveform | Boresight Angle | 3dB Angle |
|---|---|---|---|
| 0001 | PRS | +25° | 30° |
| 0002 | PRS | +25° | 20° |
| 0003 | PRS | +25° | 10° |
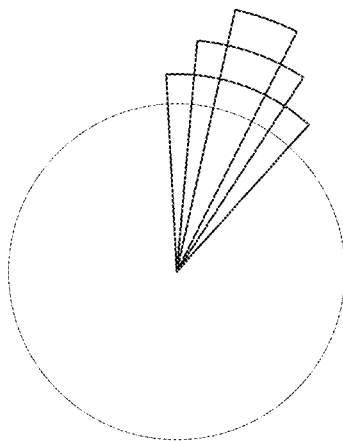
FIG. 13B
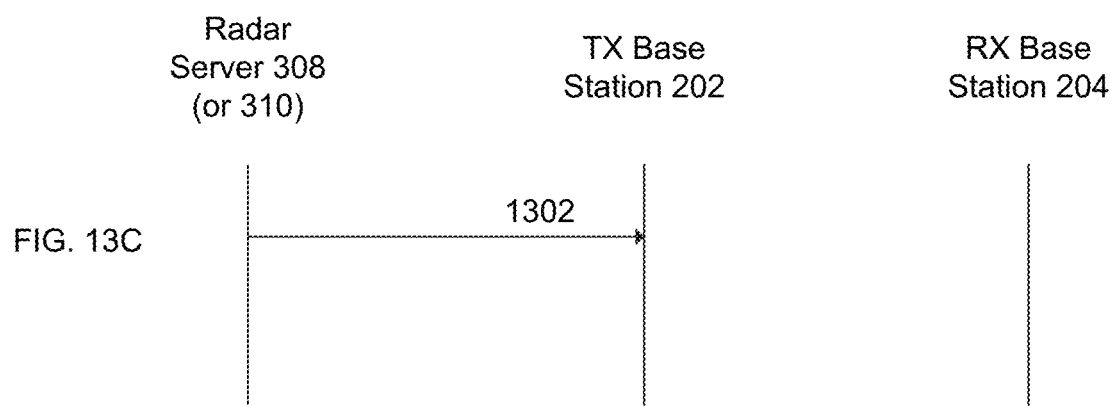
FIG. 13C FIG. 14A
| Radar Session ID | RS Waveform | Boresight Angle | 3dB Angle |
|---|---|---|---|
| 0001 | PRS | +22° | 31° |
| 0002 | PRS | +23° | 20° |
| 0003 | PRS | +22° | 12° |
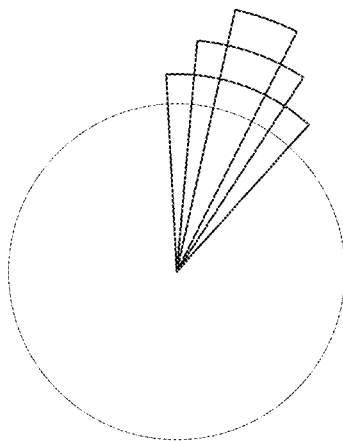
FIG. 14B
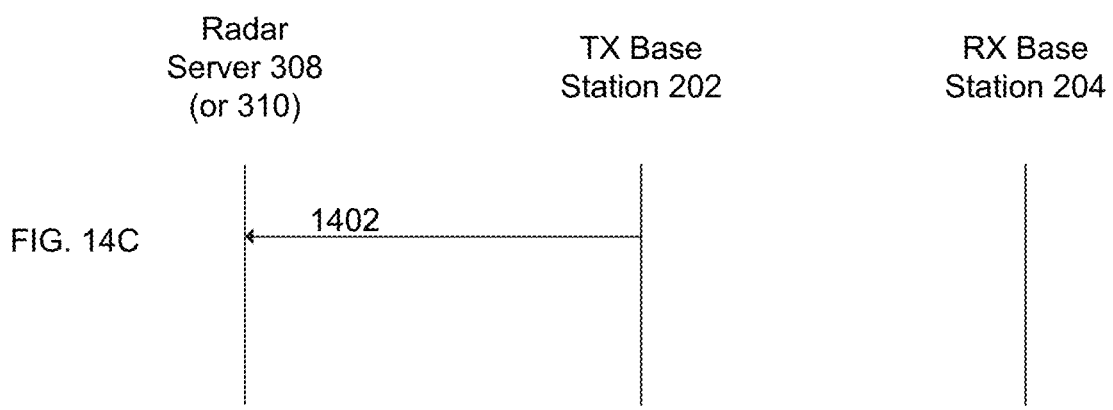
FIG. 14C FIG. 15A
| Radar Session ID | RS Waveform | Boresight Angle | 3dB Angle |
|---|---|---|---|
| 0001 | PRS | -45° | 30° |
| 0002 | PRS | -45° | 20° |
| 0003 | PRS | -45° | 10° |
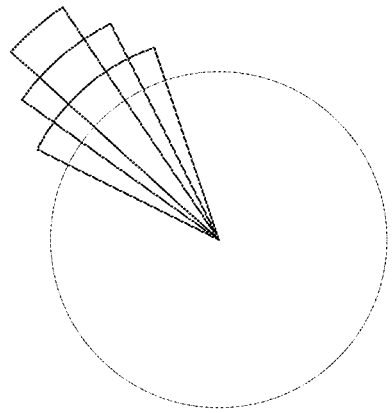
FIG. 15B
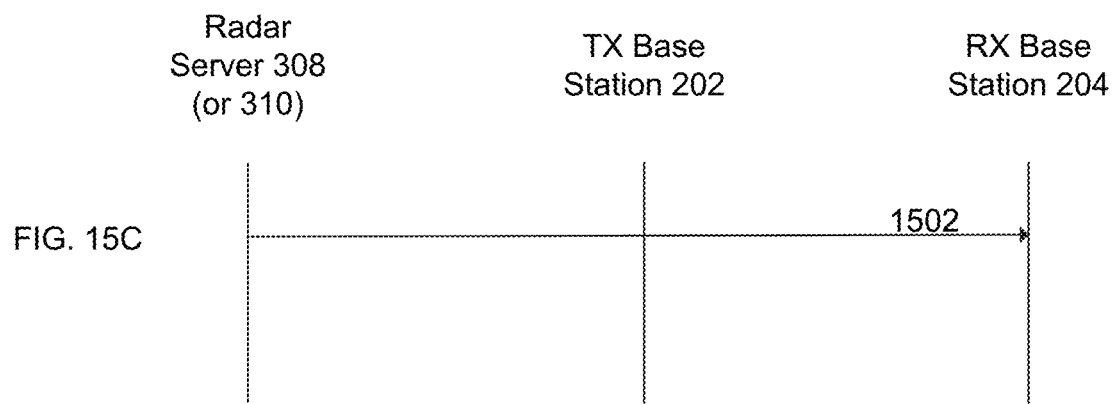
FIG. 15C FIG. 16A
| Radar Session ID | RS Waveform | Boresight Angle | 3dB Angle |
|---|---|---|---|
| 0001 | PRS | -48° | 33° |
| 0002 | PRS | -47° | 22° |
| 0003 | PRS | -48° | 12° |
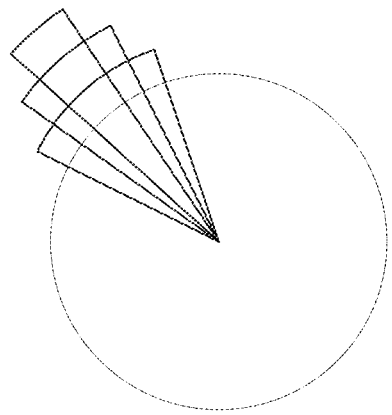
FIG. 16B
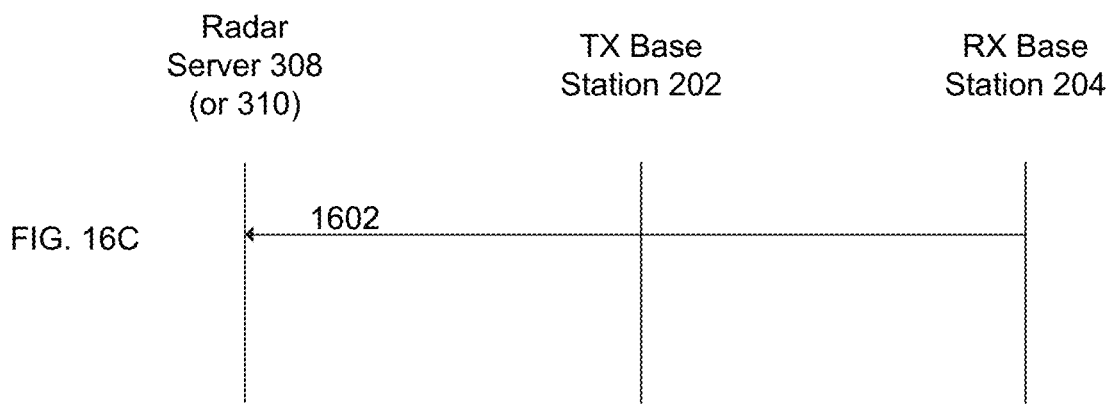
FIG. 16C

| Target ID | $T_{Rx\_LOS} - T_{Rx\_echo}$ | $\theta_R$ | $f_D$ | Measurement Timestamp | Measurement Quality |
|---|---|---|---|---|---|
| 001 | 2.42 μsec | +38° | 220 Hz | 02:58:06 | 88 |
| 002 | 1.95 μsec | +11° | 163 Hz | 02:64:07 | 75 |
| 003 | 2.86 μsec | -24° | 15 Hz | 03:23:84 | 96 |

FIG. 18

ND

US 12,146,940 B2
MEASUREMENT REPORTING FOR BISTATIC AND MULTI-STATIC RADAR IN CELLULAR SYSTEMS

CROSS-REFERENCE TO RELATED APPLICATIONS

This application claims the benefit of U.S. Provisional Application No. 63/074,413, filed Sep. 3, 2020, entitled "Measurement Reporting for Bistatic and Multi-static Radar in Cellular Systems" which is incorporated herein by reference in its entirety.

BACKGROUND

Aspects of the disclosure relate to radar technology and more specifically to bistatic and multi-static radars. Bistatic and multi-static radars have been used for sensing the range, velocity, angle, and other properties of remote objects. A significant benefit of using bistatic or multi-static radars, as opposed to monostatic radars, is that self-interference can be mitigated avoided. This is possible because the transmitter equipment is physically distinct from the receiver equipment, so the potential for leakage of the transmit radar signal from the transmitter to the receiver is substantially removed. However, in bistatic and multi-static radar systems, a transmitter and a receiver are typically separated from each other by a distance comparable to the target distance. These and other inherent characteristics of bistatic and multi-static radars have prevented them from wide adaptation. There is a need for improved techniques for the operation of bistatic and multi-static radars to enhance their usefulness and range of implementation scenarios.

BRIEF SUMMARY

Systems, methods, and non-transitory computer-readable medium storing instructions therein for a radar system are disclosed. A radar system may comprise a first wireless communications system Transmission Reception Point (TRP) configured as a transmitter for sending a transmit signal toward a target, a second wireless communications system TRP configured as a receiver for receiving an echo signal corresponding to a reflection of the transmit signal from the target, and a radar server. The first wireless communications system TRP and the second wireless communications system TRP may be part of a cellular communications system. The second wireless communications system TRP may be configured to generate one or more measurement reports containing one or more of delay, Doppler frequency, and/or angle-of-arrival information. The second wireless communications system TRP may be configured to send the one or more measurement reports to an entity within the cellular communications system.

In one embodiment, the second wireless communications system TRP is configured to send the one or more measurement reports to the radar server. The one or more measurement reports may comprise a bundled report corresponding to one or more detected targets. The radar server may be configured to send feedback information to enhance target detection performance of the second wireless communications system TRP. The bundled report may comprise, for each of the one or more detected targets, a time difference measurement corresponding to a difference between (1) a time of reception of the echo signal and (2) a time of reception of a line-of-sight (LOS) signal from the first wireless communications system TRP. The bundled report may comprise, for each of the one or more detected targets, an angle-of-arrival (AoA) estimation angle, a delay measurement, and/or a Doppler shift measurement. At least one of the AoA estimation angle, the delay measurement, or the Doppler shift measurement may be represented in the bundled report as a sequence of difference values over time for the one or more detected targets. Also, the radar server may be configured to send an instruction identifying at least one of the one or more detected targets as selected targets, and the bundled report may comprise the AoA estimation angle, the delay measurement, and/or the Doppler shift measurement for each of the selected targets. At least one of the AoA estimation angle, the delay measurement, or the Doppler shift measurement may be represented in the bundled report as a sequence of difference values over time for the one or more selected targets.

In one embodiment, the one or more measurement reports comprise a quantized delay/Doppler power profile report containing power values corresponding to a two-dimensional grid of delay bins and Doppler frequency bins. Power values in the quantized delay/Doppler power profile report may be represented as a sequence of difference values over time, subsequent to an initial report. In one embodiment, the one or more measurement reports comprise a quantized AoA/delay power profile report containing power values corresponding to a two-dimensional grid of AoA bins and delay bins. Power values in the quantized AoA/delay power profile report may be represented as a sequence of difference values over time, subsequent to an initial report. In one embodiment, the one or more measurement reports comprise a quantized AoA/Doppler power profile report containing power values corresponding to a two-dimensional grid of AoA bins and Doppler bins. Power values in the quantized AoA/Doppler power profile report may be represented as a sequence of difference values over time, subsequent to an initial report. In one embodiment, the one or more measurement reports comprise a quantized AoA/delay/Doppler power profile report containing power values corresponding to a three-dimensional grid of AoA bins, delay bins, and Doppler bins. Power values in the quantized AoA/delay/Doppler power profile report may be represented as a sequence of difference values over time, subsequent to an initial report The wireless communications system may comprise a cellular communications system. In one embodiment, the cellular communications system conforms to 5G standard introduced in the release 15 version of the 3rd Generation Partnership Project (3GPP) specifications. In one embodiment, each of the first wireless communications system TRP and the second wireless communications system TRP is a gNodeB within the cellular communications system.

A method for radar sensing may comprise sending, from a first wireless communications system TRP, a transmit signal toward a target, receiving, at a second wireless communications system TRP, an echo signal corresponding to a reflection of the transmit signal from the target, and providing, from a radar server, one or more parameters for configuring the first wireless communications system TRP to send the transmit signal and configuring the second wireless communications system TRP to receive the echo signal. The method may further comprise generating, at the second wireless communications system TRP, one or more measurement reports containing one or more of delay, Doppler frequency, and/or angle-of-arrival information, and sending, from the second wireless communications system TRP, the one or more measurement reports to an entity within a cellular communications system. The first wireless communications system TRP and the second wireless communications system TRP may be part of the cellular communications system.

A non-transitory computer-readable medium storing instructions therein for execution by one or more processing units may comprising instructions to: send, from a first wireless communications system TRP, a transmit signal toward a target; receive, at a second wireless communications system TRP, an echo signal corresponding to a reflection of the transmit signal from the target; provide, from a radar server, one or more parameters for configuring the first wireless communications system TRP to send the transmit signal and configuring the second wireless communications system TRP to receive the echo signal; generate, at the second wireless communications system TRP, one or more measurement reports containing one or more of delay, Doppler frequency, and/or angle-of-arrival information; and send, from the second wireless communications system TRP, the one or more measurement reports to an entity within a cellular communications system. The first wireless communications system TRP and the second wireless communications system TRP may be part of the cellular communications system.

A system for radar sensing may comprise means for sending, from a first wireless communications system TRP, a transmit signal toward a target, means for receiving, at a second wireless communications system TRP, an echo signal corresponding to a reflection of the transmit signal from the target, means for providing, from a radar server, one or more parameters for configuring the first wireless communications system TRP to send the transmit signal and configuring the second wireless communications system TRP to receive the echo signal, means for generating, at the second wireless communications system TRP, one or more measurement reports containing one or more of delay, Doppler frequency, and/or angle-of-arrival information, and means for sending, from the second wireless communications system TRP, the one or more measurement reports to an entity within a cellular communications system. The first wireless communications system TRP and the second wireless communications system base station may be part of the cellular communications system.

BRIEF DESCRIPTION OF THE DRAWINGS

Aspects of the disclosure are illustrated by way of example. In the accompanying figures, like reference numbers indicate similar elements, and ***.

FIG. 4 shows an example of a radar configuration parameters list provided by the radar server to a TX base station and a RX base station for a bistatic or multi-static radar measurement session, according to an embodiment of the disclosure;

FIG. 5 shows an example of a TX/RX timing sub-list, according to embodiments of the disclosure;

FIG. 6 shows an example of a Doppler sub-list, according to embodiments of the disclosure;

FIGS. 11A, 11B, and 11C illustrate three transmit beams configured for the same boresight angle and 3 dB angle;

FIGS. 12A, 12B, and 12C illustrate three receive beams configured for different boresight angles and the same 3 dB angle;

FIGS. 13A, 13B, and 13C illustrate three transmit beams configured for the same boresight angle and progressively narrower 3 dB angles;

FIGS. 14A, 14B, and 14C illustrate actual operation of three transmit beams configured based on revised parameters provided by the TX base station;

FIGS. 15A, 15B, and 15C illustrate three receive beams configured for the same boresight angle and progressively narrower 3 dB angles;

FIGS. 16A, 16B, and 16C illustrate actual operation of three receive beams configured based on revised parameters provided by the RX base station;

FIG. 18 presents examples of bundled measurement reports for three targets, according to an embodiment of the disclosure;

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
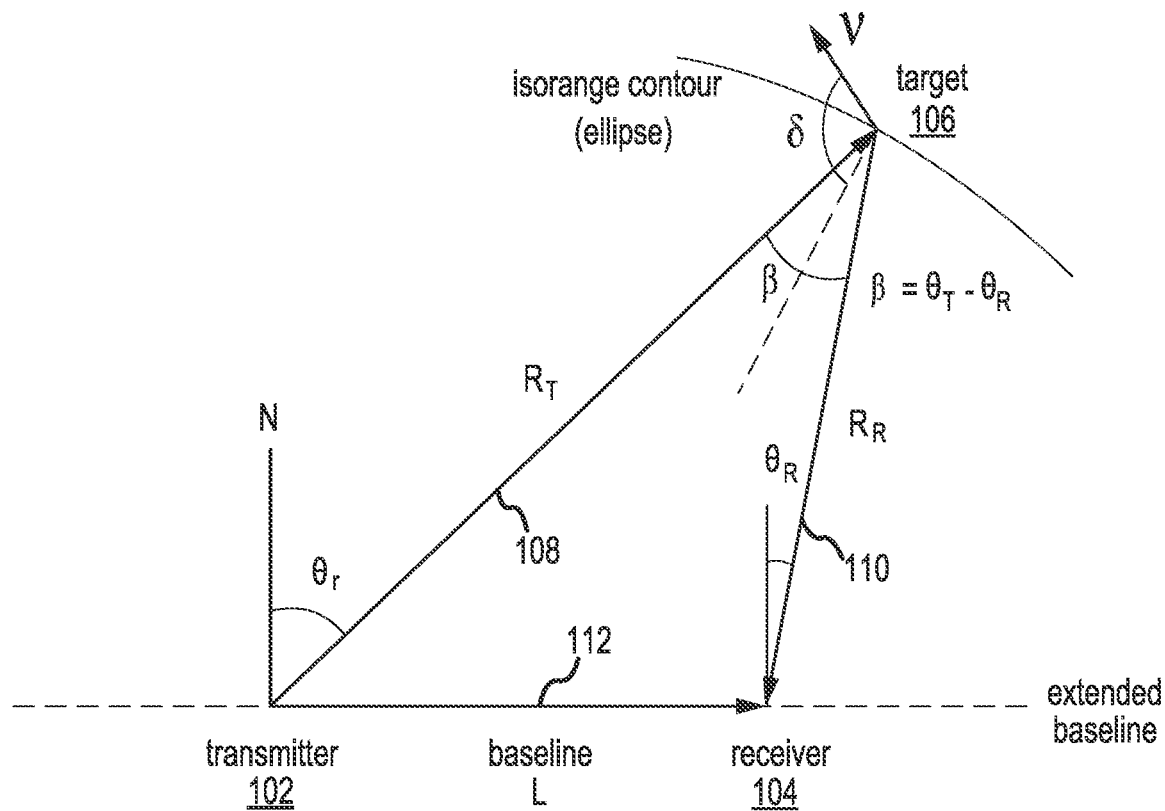
FIG. 1 is a simplified diagram showing the basic operation of a bistatic radar system.

FIG. 1 is a simplified diagram showing the basic operation of a bistatic radar system 100. A transmitter 102 and a receiver 104 are used to send and receive radar signals for sensing a target 106. While a bistatic radar example is shown, the same principals of operation can be applied to a multi-static radar, which utilizes more than two transmitter(s)/receiver(s). For example, a multi-static radar may utilize one transmitter and two receivers. In another example, a multi-static radar may utilize two transmitters and one receiver. Larger numbers of transmitters and/or receivers may also be possible.

In bistatic radar system 100, the transmitter 102 sends a transmit signal 108 which traverses a distance $R_T$ to reach target 106. The transmit signal 108 reflects from the target 106 and becomes an echo signal 110 which traverses a distance $R_R$ to reach the receiver 104. A primary function served by bistatic radar system 100 is sensing the range, or distance $R_R$, from the target 106 to the receiver 104. The system determines the range $R_R$ primary by sensing the amount of time taken for the transmit signal 108 and echo signal 110 to traverse the total distance $R_{sum}$, which is the sum of $R_T$ and $R_R$:

$$R_{sum} = R_T + R_R \quad \text{(Eq. 1)}$$

The total distance $R_{sum}$ defines an ellipsoid surface (also known as the iso-range contour) with foci at the locations of the transmitter 102 and the receiver 104, respectively. The ellipsoid surface represents all the possible locations of the target 106, given the total distance $R_{sum}$. The radar system 100 is capable of measuring the distance $R_{sum}$. For example, if perfect synchronization of timing between the transmitter 102 and the receiver 108 can be assumed, it would be easy to simply measure the time duration $T_{sum}$ between moment when the transmitter 102 sent the transmit signal 108 and moment when the receiver 104 received the echo signal 110. Multiplying the time duration $T_{sum}$ by the speed of the signal through free space, e.g., approximately $c=3*10^8$ meters/second, would yield $R_{sum}$. Thus, the ellipsoid surface of all possible locations of the target 106 can be found by measuring the "flight time" $T_{sum}$ of the bistatic radar signal.

According to some embodiments, the distance $R_{sum}$ can be measured without tight time synchronization between the transmitter 102 and the receiver 104. In one embodiment, a line-of-sight (LOS) signal 112 can be sent from the transmitter 102 to the receiver 104. That is, at the same time that transmitter 102 sends the transmit signal 108 toward the target 106, transmitter 102 may also send the LOS signal 112 toward the receiver 104. According to a specific embodiment, the transmit signal 108 may correspond to a main lobe of a transmit antenna beam pattern emitted from the transmitter 102, while the LOS signal 112 corresponds to a side lobe of the same transmit antenna beam pattern emitted from transmitter 102.

The receiver 104 receives both the echo signal 110 and the LOS signal 112 and can utilize the timing of the reception of these two signals to measure the total distance $R_{sum}$, using the expression:

$$R_{sum} = (T_{Rx\_echo} - T_{Rx_{LOS}}) * c + L \quad \text{(Eq. 2)}$$

Here, $T_{Rx\_echo}$ is the time of reception of the echo signal 110. $T_{Rx_{LOS}}$ is the time of reception of the LOS signal 112. As mentioned, $c=3*10^8$ meters/second is the speed of the signal through free space. L is the distance between the transmitter 102 and the receiver 104. Once $R_{sum}$ is found, it can be used to calculate the target range $R_R$, i.e., the distance between the target 106 and the receiver 104, using the following expression:

$$R_R = \frac{R_{sum}^2 - L^2}{2(R_{sum} + L * \sin\theta_R)} \quad \text{(Eq. 3)}$$

The bistatic radar system 100 can also be used to determine the angle of arrival (AoA) $\theta_R$ at which the echo signal 110 is received by receiver 104. This can be done in various ways. One way is to estimate $\theta_R$ by using an antenna array at the receiver 104. An antenna array, which comprises multiple antenna elements, can be operated as a programmable directional antenna capable of sensing the angle at which a signal is received. Thus, the receiver 104 may employ an antenna array to sense the angle of arrival of the echo signal 110. Another way to estimate $\theta_R$ involves multilateration. Multilateration refers to the determination of the intersection of two or more curves or surfaces that represent possible locations of a target. For example, the bistatic radar system 100 shown in FIG. 1 can define a first ellipsoid surface representing possible locations of the target 106, as described previously. A second bistatic radar system with a differently located transmitter and/or receiver can define a second, different ellipsoid surface that also represents the possible locations of the target 106. The intersection of the first ellipsoid surface and the second ellipsoid surface can narrow down the possible location(s) of the target 106. In three-dimensional space, four such ellipsoid surfaces would generally be needed to reduce the possible location to a single point, thus identifying the location of target 106. In two-dimensional space (e.g., assuming all transmitters, receivers, and the targets are confined to the being on the ground), three such ellipsoid surfaces (for two-dimensional space, the ellipsoid surfaces reduce to elliptical curves) would generally be needed to reduce the possible locations to a single point, thus identifying the location of target 106. Multilateration can also be achieved in a similar manner using multi-static radar system instead of multiple bistatic radar systems.

Furthermore, the bistatic radar system 100 can also be used to determine the Doppler frequency associated with the target 106. The Doppler frequency denotes the relative velocity of the target 106, from the perspective of the receiver 104—i.e., the velocity at which the target 106 is approaching/going away from the receiver 104. For a stationary transmitter 102 and a stationary receiver 104, the Doppler frequency of the target 106 can be calculated as:

$$f_D = \frac{2v}{c} * \cos\delta * \cos(\beta/2) \quad \text{(Eq. 4)}$$

Here, $f_D$ is the Doppler frequency, v is the velocity of the target 106 relative to a fixed frame of reference defined by the stationary transmitter 102 and receiver 104. $\beta$ is the angle formed between the transmit signal 108 and the echo signal 110 at the target 106. $\delta$ is the angle between the velocity vector v and the center ray (half angle) defined within angle $\beta$.

In FIG. 1, a fixed frame of reference is defined with respect to the stationary transmitter 102 and stationary receiver 104. Specifically, a baseline of length L can be drawn between the transmitter 102 and the receiver 104. The baseline can be extended beyond the transmitter 102 and receiver 104. One or more normal lines can be drawn as being perpendicular to the baseline. A transmit angle $\theta_T$ can be defined relative to a normal line drawn from the location of the transmitter 102. A receive angle $\theta_R$, referred to above as the angle of arrival, can be defined relative to a normal line drawn from the location of the receiver 104.

As mentioned previously, bistatic radar system 100 can be operated to sense a target in two-dimensional space or three-dimensional space. An additional degree of freedom is introduced in the case of three-dimensional space. However, the same basic principles apply, and analogous calculations may be performed.

Figure 2:
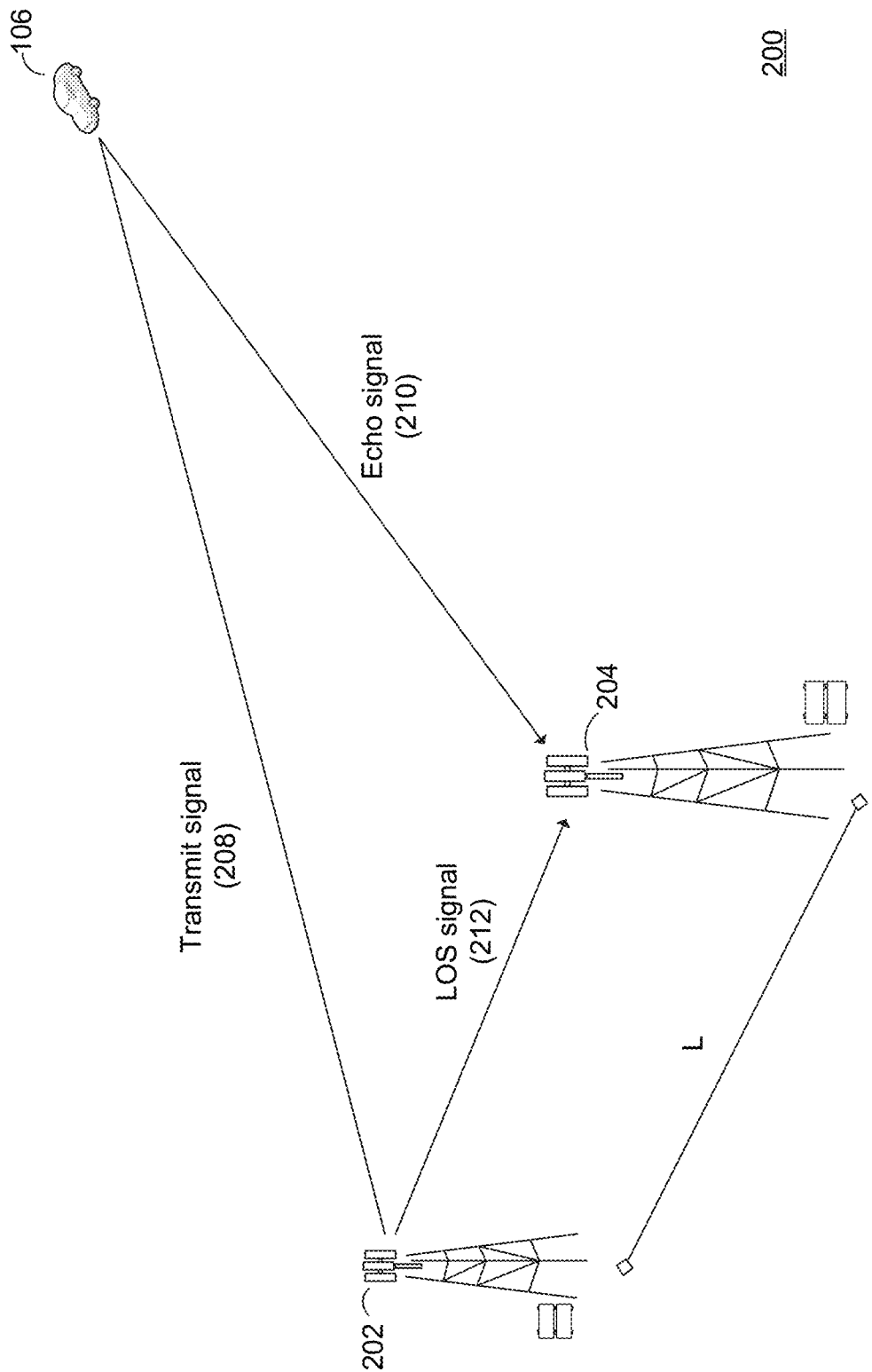
FIG. 2 illustrates the implementation of a bistatic radar system in a wireless communications system, according to an embodiment of the disclosure.

FIG. 2 illustrates the implementation of the bistatic radar system 100 in a wireless communications system, according to an embodiment of the disclosure. The wireless communications system may comprise a cellular communication system 200, as shown in FIG. 2. The cellular communications system 200 may comprise numerous Transmission Reception Points (TRPs), which provide transmission and/or reception of signals with other devices. Examples of TRPs within the cellular communications system 200 include base stations 202 and 204, which serve to provide cellular communications for user equipment (UE) such as vehicles, wireless phones, wearable device, personal access points, and a plethora of other types of user devices in the vicinity that require wireless data communications. For instance, base stations 202 and 204 may be configured to support data communications with a UE device, by transmitting data symbols to or receiving data symbols from the UE device. Resources within the cellular communication system 200, such as base station 202 and 204, may thus be utilized to serve "double duty" to support not only cellular communication operations but also bistatic and/or multi-static radar operations.

For example, base stations 202 and base station 204 may serve as the transmitter 100 and receiver 100, respectively, of the bistatic radar system 100 shown in FIG. 1. Base station 202 may transmit the transmit signal 208, which reflects from target 106 and becomes the echo signal 210 received by the base stations 204. The base station 204 may also receive a line-of-sight (LOS) signal 212 from the base station 202. By receiving both the LOS signal 212 and the echo signal 210, the RX base station 204 can measure the value associated with the time difference between the reception times $T_{Rx\_echo}$ and $T_{Rx_{LOS}}$ associated with the reception of the echo signal 210 and the LOS signal 212, respectively. For example, the RX base station 204 may cross-correlate the received LOS signal 212 with the received echo signal 210, such as by mixing the two signals in analog or digital form, to yield a value representative of the time difference $(T_{Rx\_echo} - T_{Rx_{LOS}})$. The time difference can be used to find the total distance $R_{sum}$. The total distance $R_{sum}$ can then be used to define an ellipsoid surface, which along with other information may be used to find the target range $R_R$, angle of arrival (AoA) $\theta_R$, and/or Doppler frequency associated with the target 206, using one or more techniques discussed previously with respect to FIG. 1.

Here, target 106 may be, but does not have to be, a UE that is being supported by the cellular communications system 200. In some instances, target 106 may be a UE that is configured to transmit and receive wireless signals carrying voice, text, and/or wireless data using the base stations of cellular communications system 200. In other instances, target 106 may simply be a remote object that is within the bistatic radar range of base station 202 and base station 204 but otherwise has nothing to do with the cellular communications functions of system 200.

In the bistatic example shown in FIG. 2, the transmitter is referred to as the TX base station 202, and the receiver is referred to as the RX base station 204. More generally, TX base station 202 may be referred to as a TX TRP, and RX base station 204 may be referred to as a RX TRP. Here "TX" and "RX" merely refer to the fact that base station 202 is used to transmit the radar transmission signal 208, and the base station 204 is used to receive the radar echo signal 210. The terms "TX" and "RX" in this context do not limit the operation of the base stations 202 and 204 to serve other functions, e.g., to serve as transmitter and/or receiver in other bistatic or multi-static radar operations (beyond what is illustrated in FIG. 1) or as base stations transmitting and receiving data communications in the normal operation of the cellular communications system 200. While FIG. 2 illustrates a simple bistatic radar system, a multi-static radar system may also be implemented within a cellular communications system in a similar manner. Also, while FIG. 2 illustrates a simple example in two-dimensional space, the same operations can be extended to three-dimensional space.

Implementing a bistatic or multi-static radar system within a cellular communications system according to embodiments of the present disclosure may yield numerous benefits. One particular benefit is the flexible utilization of bandwidth allocated for cellular communications. For example, according to one embodiment, the cellular communications system 200 may conform to the "5G" standard introduced in the release 15 version of the 3rd Generation Partnership Project (3GPP) specifications. Ever increasing bandwidth allotted to present and future cellular communications systems, including 5G and 5G beyond, may be leveraged for the transmission of bistatic and multi-static radar signals. Thus, radio frequency (RF) sensing (e.g. radar) may be enabled by utilizing available cellular RF spectrum resource. For example, one or more of the transmit signal 208, echo signal 210, and/or LOS signal 212 may occupy bandwidth within a portion of radio frequency (RF) spectrum allocated to the cellular communications system 200 for data communications.

Also, the inherent benefits of bistatic and multi-static radar systems can be realized by an existing, widespread network of well-positioned transmitters and receivers, in the form of cellular base stations. Compared with a monostatic radar system, a bistatic or multi-static radar system mitigates against self-interference by having physically separated transmitter equipment and receiver equipment. Cellular base stations, such as base stations 202 and 204 shown in FIG. 2, already exist and cover vast geographic areas where users, vehicles, and other objects of interest are likely to appear. Such cellular base stations are well-dispersed, and as a result, provide opportunities for the selection of appropriately located base stations to serve as transmitters and receivers for bistatic and multi-static radar operations.

A significant challenge posed in the development of a bistatic or multi-static radar system is the coordination between transmitter(s) and the receiver(s). Various techniques addressing such coordination issues are presented with embodiments of the present disclosure, as discussed in sections below.

Network Signaling of TX and RX Parameters

According to certain embodiments, a "radar server" may be implemented to support the operations of one or more bistatic and/or multi-static radar systems implemented within a cellular communications system. Here, a "radar server" is may be realized as a combination of hardware and/or software resources that reside within the cellular communications network. Thus, the radar server may be defined as a functional block, facility, or node that serves to, for example, configure and/or control parameters relied upon by TX and RX base stations involved in bistatic and/or multi-static radar operations.

Figure 3:
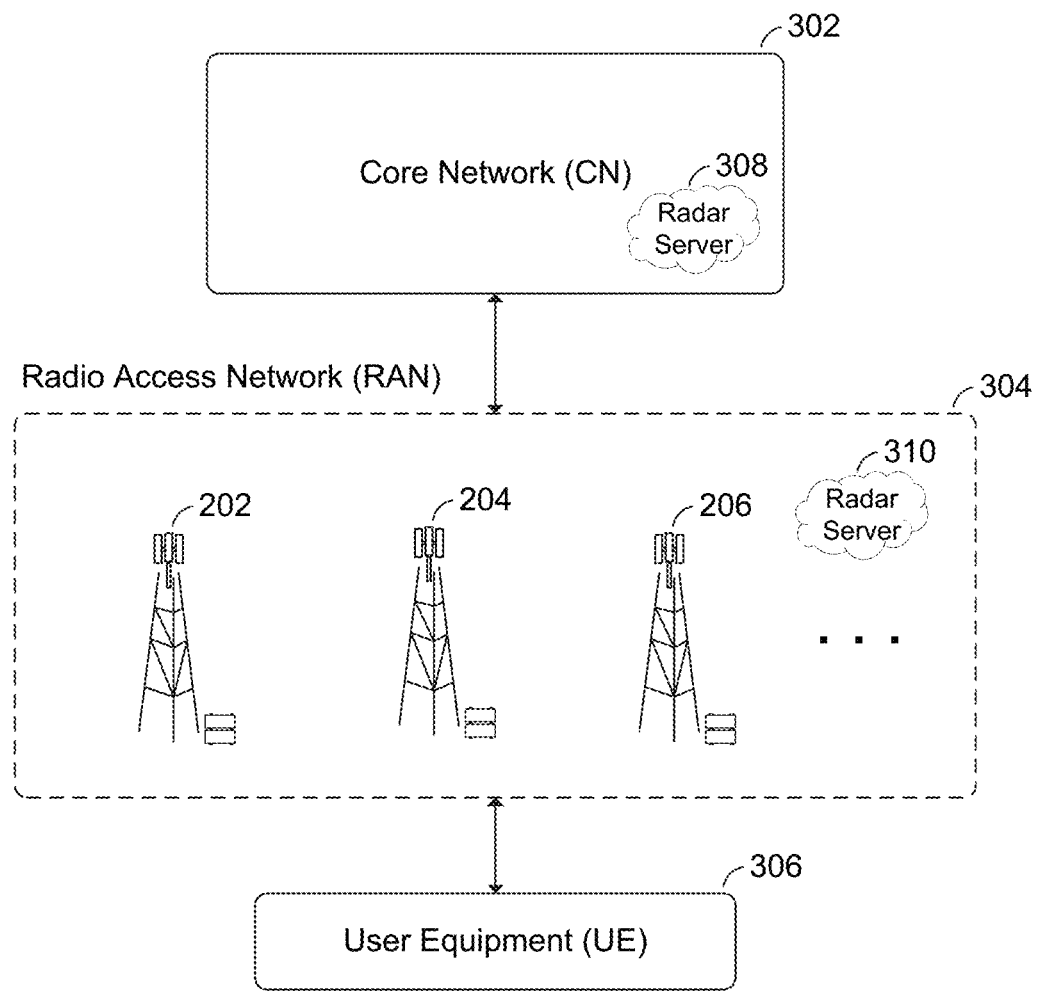
FIG. 3 is a block diagram of a cellular communication system that may include a radar server, according to an embodiment of the disclosure.

FIG. 3 is a block diagram of a cellular communication system 300 that may include a radar server, according to an embodiment of the disclosure. Cellular communications system 300 comprises a core node (CN) 302, a radio access node (RAN) 304, and one or more user equipment (UE) 306. In one embodiment, a radar server 308 may be implemented within the CN 302. The CN 302 provides system 300 with connectivity to the Internet and to application services. The CN 302 may be implemented with various computing resources, which may include memory and one or more processors executing an operating system and executing applications comprising programmed instructions. In a specific embodiment, the radar server 308 may be implemented within the computing resources of the CN 302.

In another embodiment, a radar server 310 may be implemented within the RAN 304. For example, RAN 304 may comprise base stations 202, 204, and 206. Each of the base stations 202, 204, and 206 may comprise transmitter and receiver hardware such as antennas, antenna elements, cabling, a physical tower structure, modems, encoder/decoders, networking equipment, computing resources, and other components. The computing resources associated with each base station may include memory and one or more processors executing a operating system and executing applications comprising programmed instructions. In a specific embodiment, the radar server 310 may be implemented within the computing resources of one or more of the base stations 202, 204, and 206.

In certain embodiments, the cellular communications system 300 may conform to "5G" standards. In such cases, the CN 302 may be a 5G core node (5G CN), the RAN 304 may be a 3GPP Next Generation Radio Access Network (NG RAN), and each of the base stations 202, 204, and 206 may be a "gNodeB" or "gNB."

FIG. 4 shows an example of a radar configuration parameters list 400 provided by the radar server 308 (or 310) to the TX base station 202 and the RX base station 204 for a bistatic or multi-static radar measurement session, according to an embodiment of the disclosure. Here, a radar measurement session may comprise one or more radar signal transmissions/receptions associated with obtaining a range, Doppler, or angle estimation on a target. An example of such a radar measurement session may be a sequence of "chirps" of a frequency modulated continuous wave (FMCW) radar signal transmitted by the TX base station, with a corresponding sequence of echoed "chirps" of the FMCW radar signal received by the RX base station.

As shown in FIG. 4, the radar configuration parameters list 400 may include a number of entries, which may include values for parameters such as Radar Session ID, TX Base Station ID, RX Base Station ID, TX/RX Timing Parameters, Doppler Parameters, Radar Waveform Type, Radar Signal Center Frequency, Radar Signal Bandwidth (BW), Radar Period, Radar Repetition Factor, and linear frequency modulation (LFM) frequency slope. These parameters are presented for illustrative purposes, and entries in a configuration parameters list of any given radar system implemented within a cellular communications system may vary from the example shown in FIG. 4.

Referring again to FIG. 4, the Radar Session ID identifies a particular radar measurement session. The TX Base Station ID identifies a particular base station in the cellular communications system, as the transmitter of the radar transmit signal. The RX Base Station ID identifies a particular base station in the cellular communications system, as the receiver of the radar echo signal reflected from the target. The example shown in FIG. 4 assumes a basic bistatic radar measurement session, using one transmitter and one receiver. IDs for additional transmitter(s) and/or receiver(s) may be included for a multistatic radar measurement session. TX/RX Timing Parameters may contain multiple entries and comprise a sub-list (described in more detail in later sections). A link or pointer may be provided to the sub-list. Similarly, Doppler Parameters may contain multiple entries and comprise a sub-list, for which a link or pointer may be provide. Radar Waveform Type specifies the type of waveform to be used. Different tuple values may correspond to different types of waveforms. Just as an example, the following values and corresponding waveforms may be provided:

"0"=FMCW
"1"=Position Reference Signal (PRS)
"2"=Single-sideband Modulation (SSB)
"3"=Tracking Reference Signal (TRS)
"4"=Demodulation Reference Signal (DMRS)
"5"=Channel State Information Reference Signal (CSI-RS)

Various waveforms may be selected. Some waveforms such as FMCW may be associated with radar system. However, other waveforms such as PRS, SSB, TRS, DMRS, and CSI-RS may be associated with cellular system operations. Thus, waveforms already in existence in the cellular communications system may be opportunistically used as radar signal waveforms, in accordance with embodiments of the disclosure.

The Radar Signal Center Frequency specifies the center frequency of the radar transmit signal. Just as an example, a center frequency of 79 GHz is shown in FIG. 4. Thus, the center frequency in this example fall within the spectrum allocated for the cellular communications system 200 (e.g., within the 5G spectrum, which ranges from 300 MHz to 100 GHz). The center frequency of the radar echo signal may exhibit a Doppler shift away from the Radar Center Frequency. Such a Doppler shift is discussed in more detail in later sections. The Radar Signal Bandwidth (BW) specifies the bandwidth of the transmit radar signal. Just an example, a bandwidth of 2 GHz is shown in FIG. 4. The radar echo signal is expected to have the same bandwidth. The Radar Repetition Factor specifies the number of times a radar waveform may be repeated in the specified radar session, e.g., in Radar Session 12345678. In this example, the waveform is repeated 10 times. The LFM Frequency Slope specifies the slope, or rate of change, of the frequency of a linear frequency modulated (LFM) radar waveform. Here, the slope is 100 MHz/usec. One type of LFM wave form is the FMCW waveform mentioned previously.

To summarize, the radar session specified in FIG. 4 may utilize an FMCW waveform that forms a "chirp" which is repeated 10 times, for a total duration of 200 μsec. Each chirp may have a duration of 20 μsec, during which the center frequency of the continuous wave (CW) signal is linearly increased, at a rate of 100 MHz/μsec, from 79 GHz to 81 GHz. Even though the CW signal has a very narrow bandwidth, the effective bandwidth of the entire sweep of the FMCW signal is 2 GHz.

Embodiments of the present disclosure can leverage the cellular communications system 200 to estimate certain physical properties in the radar system. For example, the distance L between the TX base station 202 and the RX base station 204 is an important figure that may be useful in the calculation of the target range $R_R$ and other values. Resources available within the wireless communications system 200 may provide different ways to determine L. One possibility is to use the known locations of the TX base station 202 and the RX base station 204. Such location information may be available, for example, in an almanac of collected physical descriptions available for all base stations within the cellular communications system 200. Another possibility is to use GNSS (e.g., GPS) reports from base stations such as the TX base station 202 and the RX base station 204. Often, GNSS reports include the location of base stations. Using accurate longitudinal and latitude information available for the base station locations, the distance L between the TX base station 202 and the RX base station 204 can be calculated. Yet another possibility is to use inter-base stations positioning signals to obtain location fixes for TX base station 202 and the RX base station 204. For example, positioning signals such as Position Reference Signals (PRS) may be transmitted and received between base stations, according to positioning techniques available with New Radio/5G standards. Such inter-base station positioning signals may be used to determine position fixes for TX base station 202 and the RX base station 204, and the distance L between them can thus be determined.

FIG. 5 shows an example of a TX/RX Timing Sub-list 500, according to embodiments of the disclosure. In one specific embodiment, the TX/RX Timing Sub-list 500 may simply be incorporated as additional entries in the radar configuration parameters list 400. In another specific embodiment, the TX/RX Timing Sub-list 500 may be a separate but linked sub-list.

The timing parameters specified in the TX/RX Timing Sub-list 500 relies on some level of timing synchronization between the TX base station 202 and the RX base station 204. Such TX/RX timing synchronization is important for numerous reasons. The performance of the radar system can be greatly improved if the RX base station 204 starts "listening" at just the right time, i.e., upon arrival of the first expected signal, which may be either the LOS signal 212 or the echo signal 210 (or just shortly before such arrival). If the RX base station 204 begins listening too early, the system would turn on equipment such as intermediate frequency (IF) receive hardware prematurely, wasting power and computational resource and increasing the probability of false alarm for the radar system. If the RX base station 204 begins listening too late, the system might miss receiving the LOS signal 212 or the echo signal 210. If a certain level of timing synchronization between the TX base station 202 and the RX base station 204 can be achieved, then with knowledge of when the transmit signal 208 is sent from the TX base station 202, calculations can be made to predict the arrival time of the LOS signal 212 or the echo signal 210 at the RX base station 204 (with some degree of acceptable uncertainty). That way, the RX base station 204 can be controlled to start "listening" at just the right time, in order to reduce unnecessary waste of power and computational resources as well as minimize false alarms, while ensuring that the LOS signal 212 and the echo signal 210 are not missed.

Embodiments of the present disclosure advantageously leverages the cellular communications system 200 to meet such radar TX/RX timing synchronization requirements. For instance, the cellular communications system 200 may comprise a 5G system (e.g., system 300) that guarantees the timing synchronization error between any two base station to not exceed a certain amount of time. Just as an example, the 5G system may utilize orthogonal frequency division multiplexing (OFDM) signals for data communications and may guarantee that the timing synchronization error between any two base stations to not exceed the duration of a cyclic prefix (CP) of the OFDM signal. The CP is a guard band in time that separates consecutive data symbols and provides protection against inter-symbol interference (ISI). For a 60 kHz subcarrier channel, the CP duration may be 1.69 μsec, for example. Thus, the cellular communications system 200 in this case may guarantee that the timing error between any two base stations would not exceed 1.69 μsec. With such a time synchronization guarantee, the radar server 308 (or 310) may be able to more effectively control the timing of when the TX base station 202 sends the transmit signal 208 and when the RX base station begins to listen for the LOS signal 212 and the echo signal 210.

Referring back to FIG. 5, the TX/RX Timing Sub-list 500 may comprise a Radar Session ID (discussed previously), a TX Transmission Time, an Expected Receive Time, and an Expected Receive Time Uncertainty. The radar server 308 (or 310) may provide all or a relevant portion of the TX/RX Timing Sub-list 500 to the TX base station 202 and the RX base station 204. For example, the radar server 308 (or 310) may provide the TX Transmission Time, specified in this example as 20000.00 μsec, to the TX base station 202. In response, the TX base station begins transmitting the transmit signal 208 at time 20000.00 μsec. Just as an example, the value of "20000.00 μsec" may correspond the lapsed time since the last "tick" of a periodic reference event/signal used to synchronize timing across entities, e.g., all base stations and other equipment, within the cellular communications network 200.

The radar server 308 (or 310) may also provide the Expected Receive Time, specified in this example as 20133.33 μsec, to the RX base station 204. The radar server 308 (or 310) may be able to calculate the Expected Receive Time in different ways. In one embodiment, the Expected Receive Time may be estimated by assuming that the LOS signal 212 is likely to arrive at the RX base station before the echo signal 210, which is a valid assumption in many cases. Given that assumption, the Expected Receive Time may be estimated to be the TX Transmission time plus the amount of time that the LOS signal 212 is expected to take to traverse the distance L:

$$\text{Expected Receive Time} = L/c + TX \text{ transmission Time} \quad \text{(Eq. 5)}$$

The radar server 308 (or 310 may also provide the Expected Receive Time Uncertainty, specified in this example as a pair of values: [upper bound, lower bound]. The lower bound may simply be the negative of the network synchronization error. Just as an example, the network synchronization error may be 1.69 μsec. The upper bound may include two components. The first component of the upper bound may correspond to the signal propagation time associated with the maximum possible distance of a detectable target. In one embodiment, such a maximum distance L_Max may be specified as part of the link budget. Thus, the first component of the upper bound may be expressed as L_Max/c=L/c. The second component of the upper bound may simply be positive of the network synchronization error, which is specified as 1.69 μsec in the present example. Accordingly, the Expected Receive Time Uncertainty may be expressed as:

Expected Receive Time Uncertainty=[lower bound, upper bound]=[−network syn uncertainty, L_max/c−L/c+network syn error]  (Eq. 6)

There can also be flexibility in the manner of specifying and communicating these and other configuration parameters. For example, to specify the upper bound of the Expected Receive Time Uncertainty, it may be sufficient for the radar server 308 (or 310) to simply send the value of "L_max/c+network syn err" to the RX base station 204, especially if the term L/c is already known locally at the RX base station 204.

In response, the RX base station 204 may begin "listening"—i.e., begin sensing the LOS signal 212 and echo signal 210—in the time window specified by:

Expected Receive Time+Expected Receive Time Uncertainty=Expected Receive Time+[lower bound,upper bound]=[Lc+TX Transmission Time−network syn uncertainty, L_max/c+TX Transmission Time+network syn error]  (Eq. 7)

The above illustrates the TX/RX timing parameters for one bistatic radar session which involves one TX base station and one RX base station. In practice, many such bistatic radar sessions (as well as multi-static radar sessions) may be specified in a similar manner. For each unique path L, i.e., unique pair of TX station and RX station, the radar server 308 (or 310) may specify a different set of TX/RX timing parameters. In a simple multi-static case having one transmitter and multiple receivers, the unique pairs may share a common TX base station but have different RX base stations. In such a case, one TX Transmission Time and multiple sets of Expected Receive Time and Expected Receive Time Uncertainty may be specified.

FIG. 6 shows an example of a Doppler Sub-list 600, according to embodiments of the disclosure. In one specific embodiment, the Doppler Sub-list 600 may simply be incorporated as additional entries in the radar configuration parameters list 400. In another specific embodiment, the Doppler Sub-list 600 may be a separate but linked sub-list.

The Doppler Sub-list 600 mainly serves to estimate the Doppler shift and Doppler spread for the benefit of the RX base station 204. As shown in FIG. 6, Doppler Sub-list 600 may comprise a Radar Session ID (discussed previously), an Expected Doppler Shift value, and an Expected Doppler Spread value. The radar server 308 (or 310) generally provides these frequency-domain parameters to enhance the performance of the RX base station 204. It is possible that the target 106 may be moving quickly, which can introduce a large Doppler shift and/or Doppler spread. By providing the Doppler Sub-list 600, the radar server 308 (or 310) can dynamically configure the "expected Doppler shift" and "expected Doppler spread" assumed by the RX base station 204.

For example, in an acquisition mode, the Doppler Sub-list 600 may specify a larger value for the Expected Doppler Shift and Expected Doppler spread. This allows the RX base station 204 to receive signals over a wider range of Doppler frequencies, which improves the detection rate. Just as an example, FIG. 6 shows an Expected Doppler Shift value specified as 80,000 m/sec and an Expected Doppler Spread specified as 10,000 m/sec.

By contrast, in a tracking mode, the Doppler Sub-list 600 may specify more refined and narrow values. These values may be based on the history of measurements already taken. A set of more refined Doppler parameters may focus on a specific target. An instance of the Doppler Sub-list 600 may be specified for each target being tracked. Thus, a particular RX base station 204 may receive multiple Doppler Sub-lists 600, corresponding to multiple targets.

The particular parameters shown in FIGS. 4, 5, and 6 are described for illustrative purposes. Depending on implementation, there may be deletion or addition of certain parameters, and different parameters may be specified all together. Nevertheless, configuration parameters for TX base station (s) and/or RX base station(s) in a bistatic or multi-static radar system may be provided by a radar server that is positioned within an entity, such as a core node (CN) or a radio access node (RAN), in a cellular communications network, in accordance with embodiments of the disclosure.

Figure 7A:
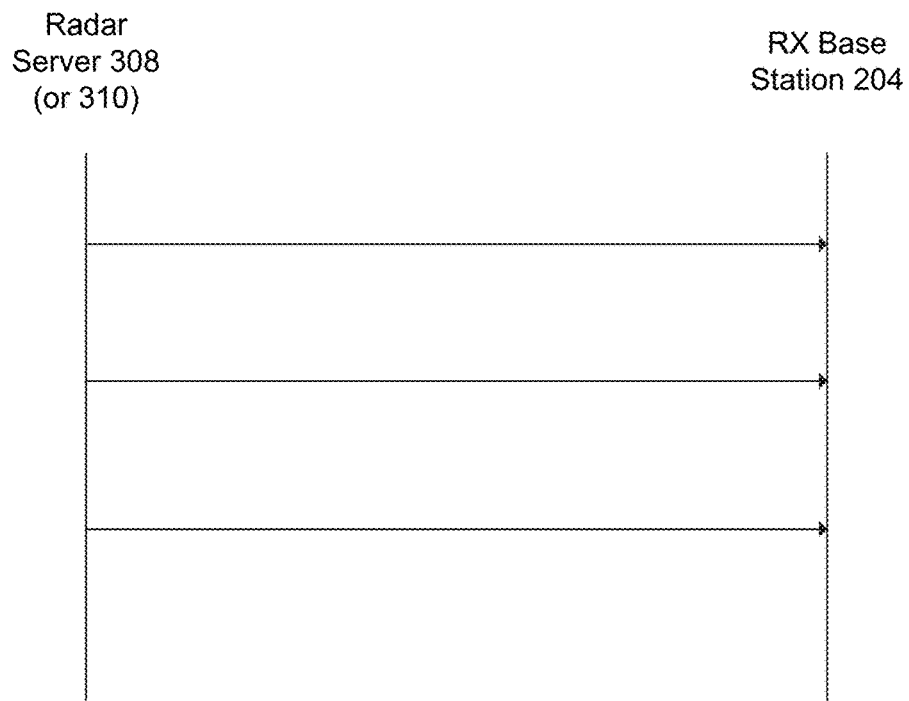
FIGS. 7A and 7B illustrates different manners of update for communicating TX/RX configuration parameters from a radar sever to a RX base station.
Figure 7B:
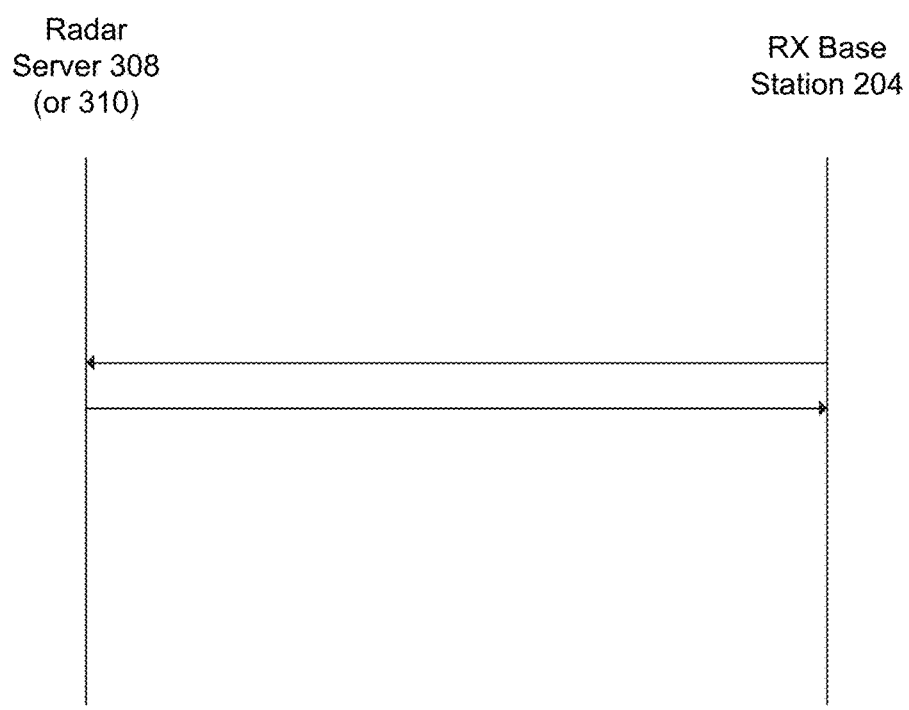

FIGS. 7A and 7B illustrates different manners of update for communicating TX/RX configuration parameters from the radar sever 308 (or 310) to the RX base station 204. The configuration parameters may comprise those presented in FIGS. 4, 5, and/or 6. While communication from a radar server to an RX base station is shown, it should be understood communication from the radar server to a TX base station may also employ similar update modes. FIG. 7A illustrates "periodic" updates, in which the radar server 308 (or 310) simply forwards the relevant configuration parameters to the RX base station on a periodic basis. These periodic updates may be appropriate when RX parameters, such as Expected Doppler Shift, are likely to change over time such that repeated updates will likely be necessary. A periodic mode may also be useful for a particular pattern of search for a target 106 involving incremental changes of one or more RX configuration parameters over time.

FIG. 7B illustrates an "RX polled" update, in which the RX base station 204 autonomously requests one or more RX configuration parameters. For example, the RX base station 204 may have been in tracking mode but senses that it has lost track of the target 106. As a result, the RX base station 204 may autonomously send a request to the radar server 308 (or 310) to send new RX parameters for entering an acquisition mode to find the target 106 one again.

Furthermore, differential encoding may be used for efficient specification of multiple sets of TX/RX parameters that have values that differ only slightly from set to the next. When differential encoding is employed, an initial set of TX/RX parameters may be specified, and thereafter, only the difference between each new set of TX/RX parameters and the previous set (or original set) of TX/RX parameters may be specified, to reduce signaling overhead.

Server-Assisted Beam Coordination

According to various embodiments of the disclosure, the radar server 308 (or 310) may also coordinate transmit and receive beams for radio frequency (RF) sensing, utilizing a bistatic or multi-static radar system implemented in a cellular communications system (e.g., cellular communications system 200). For example, the TX base station 202 may be configured to control the (1) angle of departure (AoD) and (2) spread angle of a TX beam that embodies the transmit signal 208. This may be achieved by employing an antenna array at the TX base station 202 and applying appropriate weights to the antenna elements of the antenna array. The AoD may be specified as the "boresight direction," which refers to the direction of the center axis of the TX beam. Here, the direction may be multi-dimensional and may comprise multiple parameters specified with reference to a coordinate system, e.g., a spherical coordinate system. For instance, a particular AoD direction may comprise an azimuth value (e.g., azimuth angle, as a horizontal angle ranging from 0 to 360 degrees) as well as a zenith value (e.g., zenith angle, as a vertical angle ranging from 0 to 90 degrees). The spread angle may be specified as the 3 dB angle, which refers to the angle at which the power of the TX beam becomes 3 dB below the power at the center of the TX beam.

Similarly, the RX base station may be configured to control the (1) angle of arrival (AoA) and (2) spread angle of the RX beam that represents reception of the echo signal 210. This may be achieved by employing an antenna array at the RX base station 204 and applying appropriate weights to the antenna elements of the antenna array. In a similar fashion, the AoA may be specified as the "boresight direction," which refers to the direction of the center axis of the RX beam. Again, the direction may be multi-dimensional and may comprise multiple parameters, such as an azimuth value and a zenith value. The spread angle may be specified as the 3 dB angle, which refers to the angle at which the power/gain of the RX beam becomes 3 dB below the power/gain at the center of the RX beam. By controlling the angle of arrival/departure (AoA/AoD) and spread angle of the TX and RX beams, the radar server 308 (or 310) can flexible control a wide range of possible beam patterns and scenarios for RF sensing for any region within the range of the bistatic or multi-static radar system. Some simplified examples are presented in FIGS. 8, 9, and 10 below.

Figure 8:
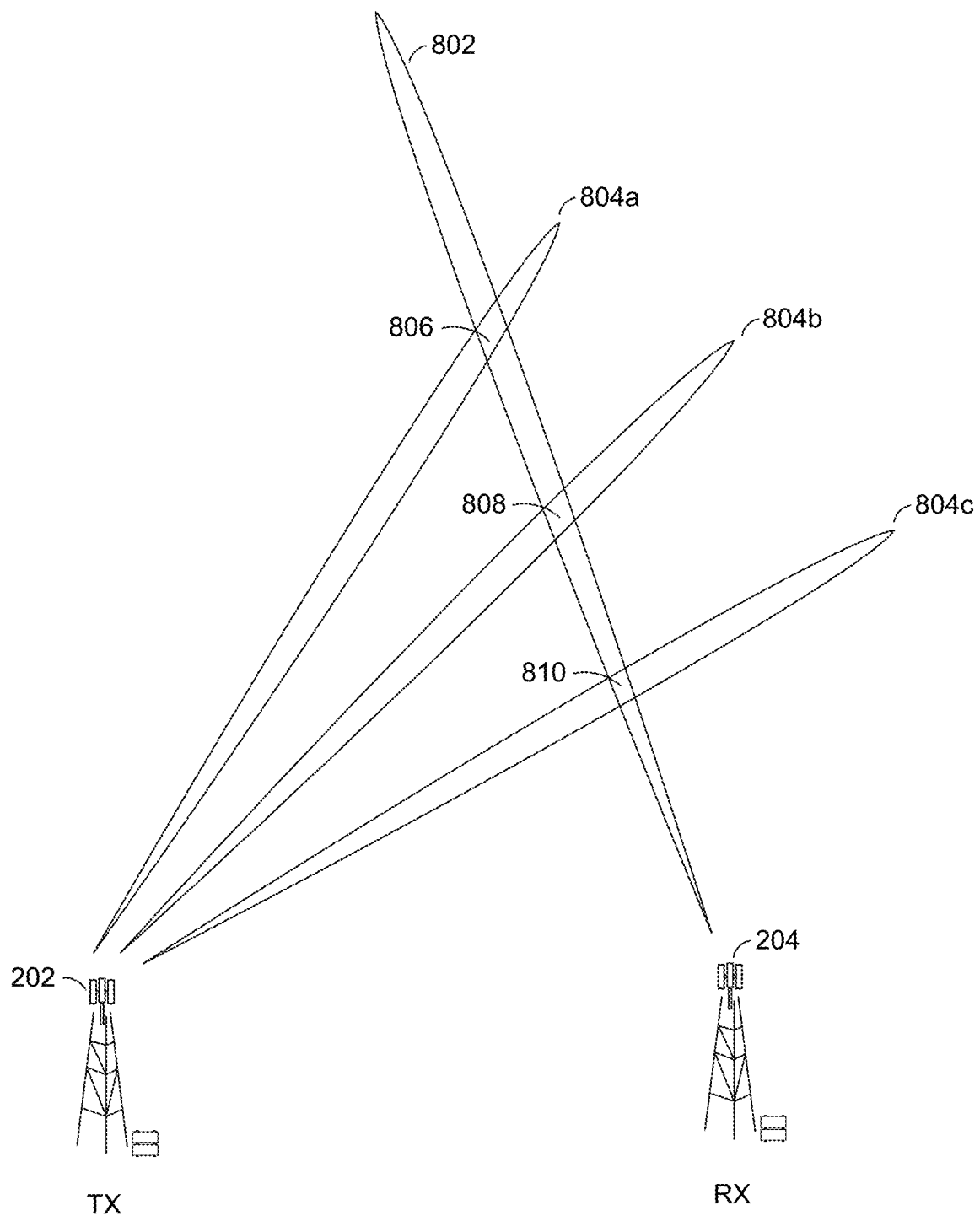
FIG. 8 illustrates a TX/RX beam sequence that keeps an RX beam at the same angle of arrival (AoA) while switching a TX beam through several different angles of departure (AoDs)

FIG. 8 illustrates a TX/RX beam sequence that keeps an RX beam at the same AoA while switching a TX beam through several different AoDs. As shown, the RX base station 204 generates an RX beam 802. While the RX beam 802 is kept at the same AoA, the TX base station 202 generates a TX beam 804 which switches through a sequence of 3 different AoDs, represented by beam instances 804a, 804b, and 804c. As can be seen, the TX/RX beam sequence results in a number of intersections between the TX beam the RX beam. In FIG. 8, these are intersections 806, 808, and 810. Each intersection represents a location where the radar system directs both a TX beam and an RX beam and therefore represents a scanned location where a target may be detected, if one is present.

The TX/RX beam sequence shown in FIG. 8 may be used as a building block to form a larger TX/RX beam scanning pattern. An example of such a TX/RX beam scanning pattern is shown below:

Example 1

RX base station:
AoA1 for X time instances→AoA2 for X time instances→AoA3 for X time instances
TX base station:
AoD1→AoD2→ . . . AoDX AoD1→AoD2→ . . . AoDX AoD1→AoD2→ . . . AoDX This TX/RX beam scanning pattern is formed using 3 TX/RX beam sequences. In the first TX/RX beam sequence, the RX beam is kept at a first AoA, which is denoted as AoA1, and the TX beam is switched through a sequence of X AoDs, which are denoted as AoD1, AoD2, . . . AoDX. In the second TX/RX beam sequence, the RX beam is kept at a second AoA, which is denoted as AoA2, and the TX beam is switched through the same sequence of X AoDs, denoted as AoD1, AoD2, . . . AoDX. In the third TX/RX beam sequence, the RX beam is kept at a third AoA, which is denoted as AoA3, and the TX beam is switched through the same sequence of X AoDs, denoted as AoD1, AoD2, . . . AoDX. If the TX/RX beam scanning pattern produces beam intersections that are sufficiently large and packed sufficiently close together, an entire field of view of the radar system may be scanned without any missed areas or "holes."

Figure 9:
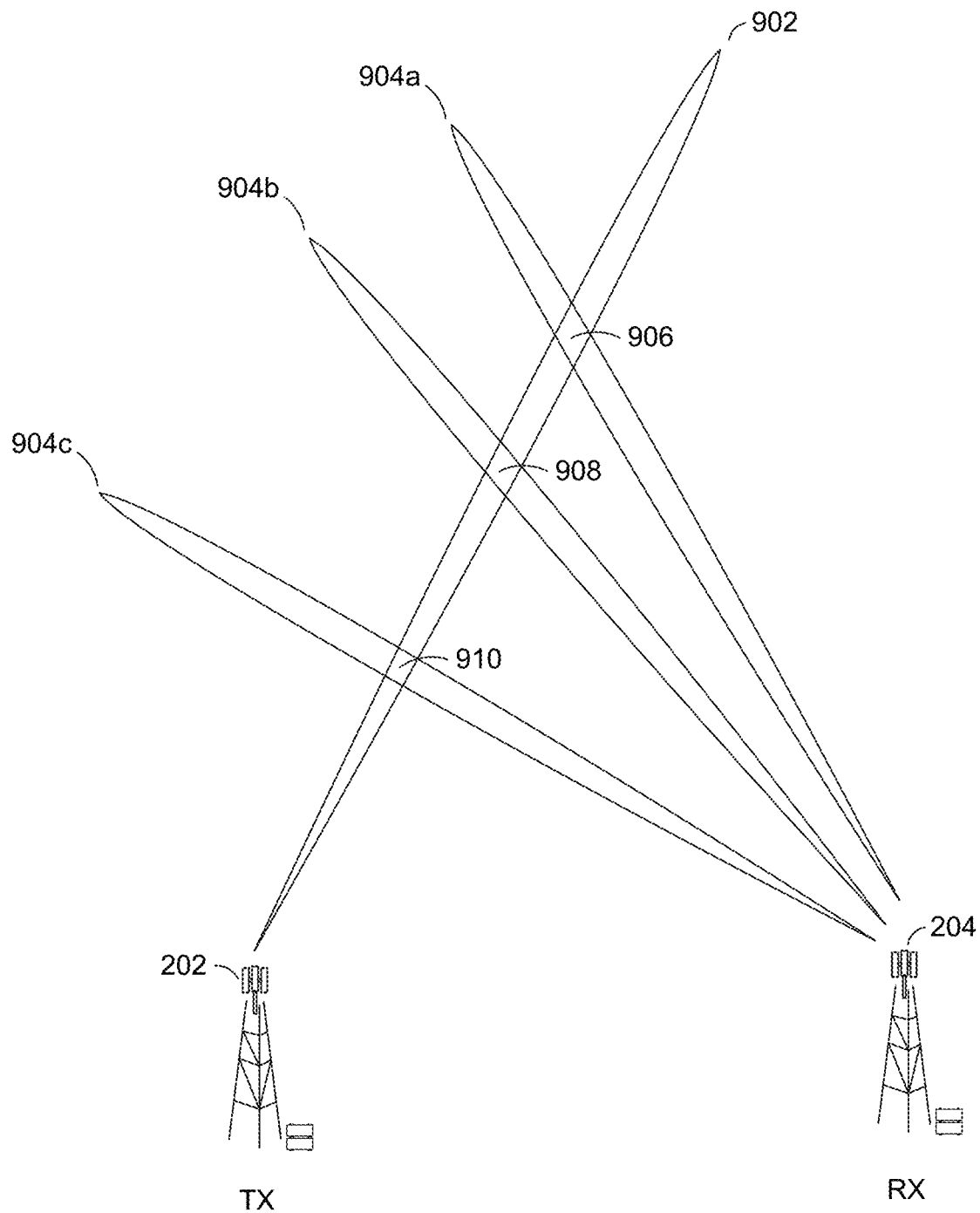
FIG. 9 illustrates a different TX/RX beam sequence that keeps a TX beam at the same angle of departure (AoD) while switching an RX beam through several different angles of arrival (AoAs)

FIG. 9 illustrates a different TX/RX beam sequence that keeps a TX beam at the same AoD while switching an RX beam through several different AoAs. As shown, the TX base station 202 generates a TX beam 902. While the TX beam 902 is kept at the same AoD, the RX base station 204 generates an RX beam 904 which switches through a sequence of 3 different AoAs, represented by beam instances 904a, 904b, and 904c. As can be seen, the TX/RX beam sequence results in a number of intersections between the TX beam the RX beam. In FIG. 9, these are intersections 906, 908, and 910. Each intersection represents a location where the radar system directs both a TX beam and an RX beam and therefore represents a scanned location where a target may be detected, if one is present.

The TX/RX beam sequence shown in FIG. 9 may be used as a building block to form a larger TX/RX beam scanning pattern. An example of such a TX/RX beam scanning pattern is shown below:

Example 2

RX base station:
AoA1→AoA2→ . . . AoAX AoA1→AoA2→ . . . AoAX AoA1→AoA2→ . . . AoAX
TX base station:
AoD1 for X time instances→AoD2 for X time instances→AoD3 for X time instances This TX/RX beam scanning pattern is formed using 3 TX/RX beam sequences. In the first TX/RX beam sequence, the TX beam is kept at a first AoD, which is denoted as AoD1, and the RX beam is switched through a sequence of X AoAs, which are denoted as AoA1, AoA2, . . . AoAX. In the second TX/RX beam sequence, the TX beam is kept at a second AoD, which is denoted as AoD2, and the RX beam is switched through the same sequence of X AoAs, denoted as AoA1, AoA2, . . . AoAX. In the third TX/RX beam sequence, the TX beam is kept at a third AoD, which is denoted as AoD3, and the RX beam is switched through the same sequence of X AoAs, denoted as AoA1, AoA2, . . . AoAX. Again, If the TX/RX beam scanning pattern produces beam intersections that are sufficiently large and packed sufficiently close together, an entire field of view of the radar system may be scanned without any missed areas or "holes."

Figure 10:
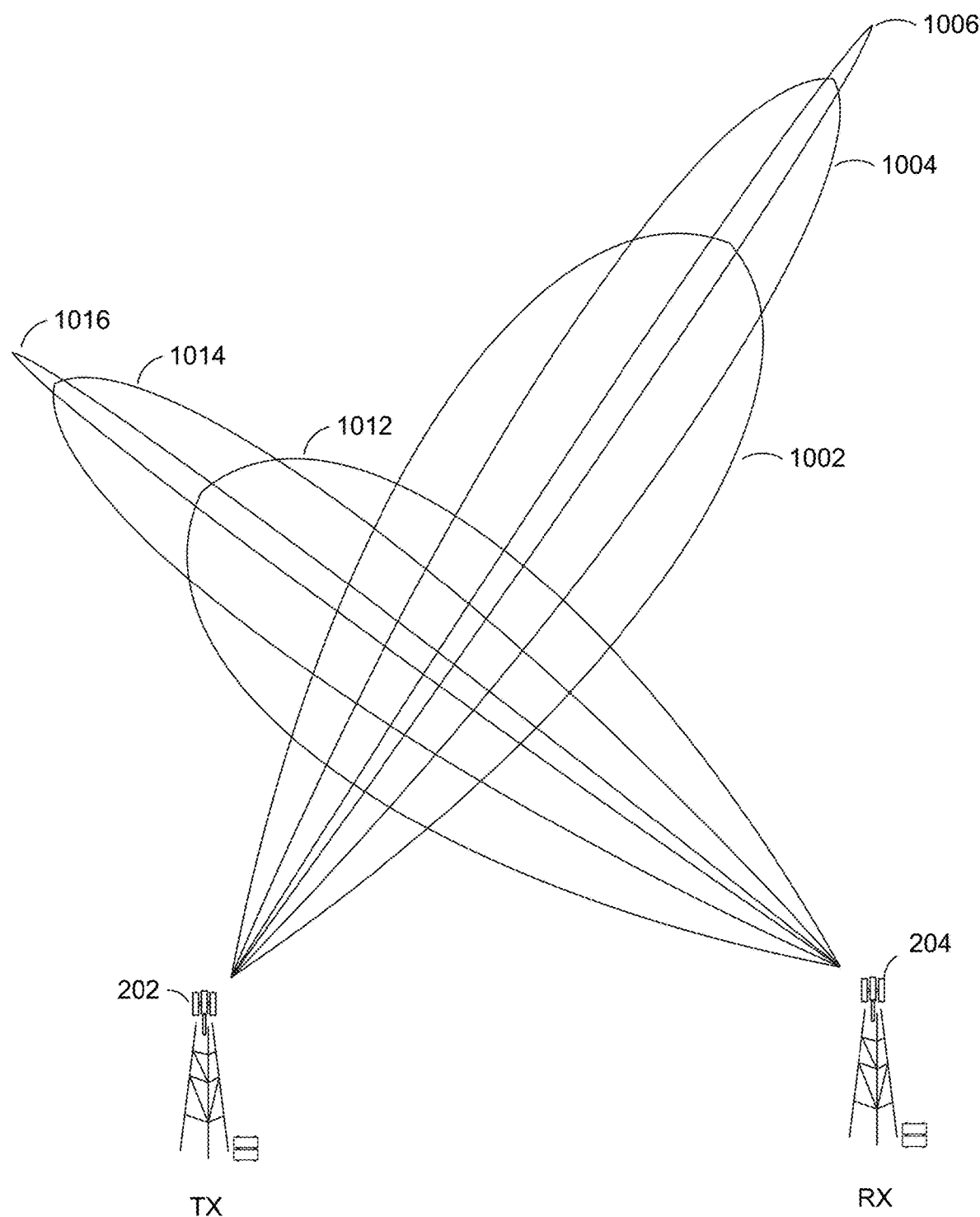
FIG. 10 illustrates a TX/RX beam sequence that maintains a constant AoD and a constant AoA while progressively reducing the beam width of both the TX beam and the RX beam.

FIG. 10 illustrates a TX/RX beam sequence that maintains a constant AoD and a constant AoA while progressively reducing the beam width of both the TX beam and the RX beam. As shown, the TX base station 202 generates sequence of TX beams. The sequence of TX beams includes a TX beam 1002 having a first beam width BW1, followed by a TX beam 1004 with a narrower beam width BW2, then followed by a TX beam 1006 with an even narrower beam width BW3. Meanwhile, the RX base station 204 generates a sequence of RX beams synchronized to the sequence of TX beams. The sequence of RX beams includes an RX beam 1012 having a first beam width BW1, followed by an RX beam 1014 with a narrower beam width BW2, then followed by an RX beam 1016 with an even narrower beam width BW3. The TX/RX beam sequence shown in FIG. 10 may be used to implement a hierarchical codebook of nested areas of interest with progressively narrower focus.

The TX/RX beam sequence shown in FIG. 10 may be part of a TX/RX beam scanning pattern, as shown below:

Example 3

RX base station:
AoA1→AoA1→ . . . AoA1 with decreasing AoA spread (hierarchical codebook), decreasing bandwidth
TX base station:
AoD1→AoD1→ . . . AoD1 with decreasing AoD spread (hierarchical codebook), decreasing bandwidth. Here, beam width is used to illustrate an example of a beam pattern that can be controlled. The beam pattern may be three-dimensional in nature, even though only two dimensions are shown in FIG. 10 for ease of illustration. The beam pattern may comprise, for example, the shape of a main lobe as well as the shape of multiple side lobes of a beam. By varying the antenna coefficients appropriately, the desired beam pattern may be achieved. Transmit beam patterns and receive beam patterns may be controlled in this manner. According to one embodiment, the beam pattern and the boresight angle of each beam can be separately controlled.

In some embodiments, a TX/RX beam sequence may involve changing the TX and/or RX beam pattern. For example, each successive beam pattern may have (1) fewer sidelobes, (2) sidelobes with less power (e.g., less than X dBs, as compared to the power of the main lobe in the boresight direction), (3) smaller backlobe, (4) other beam characteristics, or a combination of the above. FIGS. 8, 9, and 10 demonstrate some basic capabilities of radar sever 308 (or 310) to configure the angle and beam pattern of the TX beams sent by the TX base station 202 and RX beams received by the RX base station 204. While FIGS. 8, 9, and 10 illustrates these capabilities graphically in two-dimensional space, each of the TX and RX beams shown in these figures may comprise a three-dimensional beam. Thus, the intersection between such a TX beam and RX beam may have a three-dimensional shape, as well.

FIGS. 11A, 11B, and 11C illustrate three transmit beams configured for the same boresight angle and 3 dB angle. FIG. 11A shows the configuration of the three transmit beams as reference signals (RS) with specified waveforms, boresight angles, and 3 dB angles. As depicted, the signals may be organized as separate radar sessions. For radar session 0001, a PRS waveform is specified, with a boresight angle of +25° and a 3 dB angle of 10°. For radar session 0002, a PRS waveform is specified as well, again with a boresight angle of +25° and a 3 dB angle of 10°. For radar session 0003, once again with a PRS waveform is specified, with a boresight angle of +25° and a 3 dB angle of 10°. Thus, the transmit beam is kept at the same boresight angle and 3 dB angle for all three radar sessions. This may correspond, for example, to the situation described in FIG. 9, in which the transmit beam 902 is kept at the same AoD while the receive beam 904 is switched through different AoDs.

FIG. 11B shows a top-down view of the three transmit beams configured for the same boresight angle and 3 dB angle. Essentially, the same transmit beam is repeated. Therefore, the three transmit beams appear as one beam in this view.

FIG. 11C shows the messaging of configuration parameters among the radar server 308 (or 310), the TX base station 202, and the RX base station 204. Here, the configuration parameters specified in FIG. 11A are sent from the radar server 308 (or 310) to the TX base station 202. The configuration parameters may be sent as three separate instructions 1102, 1104, and 1106, one for each radar session, which is shown in this figure. Alternatively, the configuration parameters for all three radar sessions may be sent as one instruction. For simplicity of illustration, FIG. 11A only shows the session ID, RS waveform, boresight angle, and 3 dB angle being specified. However, other configuration parameters such as those shown in FIGS. 4, 5, and 6, including TX and RX timing, radar signal center frequency, bandwidth, period, etc., may also be specified in the messaging depicted in FIG. 11C.

FIGS. 12A, 12B, and 12C illustrate three receive beams configured for different boresight angles and the same 3 dB angle. FIG. 12A shows the configuration of the three receive beams as reference signals (RS) with specified waveforms, boresight angles, and 3 dB angles. The signals may be organized as separate radar sessions, which match up with the radar sessions described previously in FIG. 11A for corresponding transmit beams. For radar session 0001, a PRS waveform is specified, with a boresight angle of −35° and a 3 dB angle of 10°. For radar session 0002, a PRS waveform is specified, with a boresight angle of −45° and a 3 dB angle of 10°. For radar session 0003, a PRS waveform is specified, with a boresight angle of −55° and a 3 dB angle of 10°. Thus, the receive beams change their boresight angles while keeping the same 3 dB angle over the three radar sessions. This may correspond, for example, to the situation described in FIG. 9, in which the transmit beam 902 is kept at the same AoD while the receive beam 904 is switched through different AoDs.

FIG. 12B shows a top-down view of the three receive beams configured for different boresight angles and the same 3 dB angle. For clarity of illustration, the three receive beams are shown as having different signal strengths. In practice, the signal strengths of these signals may be separately specified and may or may not be different from each other.

FIG. 12C shows the messaging of configuration parameters among the radar server 308 (or 310), the TX base station 202, and the RX base station 204. Here, the configuration parameters specified in FIG. 12A are sent from the radar server 308 (or 310) to the RX base station 204. The configuration parameters may be sent as three separate instructions 1202, 1204, and 1206, one for each radar session, which is shown in this figure. Alternatively, the configuration parameters for all three radar sessions may be sent as one instruction. For simplicity of illustration, FIG. 12A only shows the session ID, RS waveform, boresight angle, and 3 dB angle being specified. However, other configuration parameters such as those shown in FIGS. 4, 5, and 6, including TX and RX timing, radar signal center frequency, bandwidth, period, etc., may also be specified in the messaging depicted in FIG. 12C.

FIGS. 13A, 13B, and 13C illustrate three transmit beams configured for the same boresight angle and progressively narrower 3 dB angles. Such configurations may be specified in a "hierarchical codebook," as discussed in more detail below. FIG. 13A shows the configuration of the three transmit beams as reference signals (RS) with specified waveforms, boresight angles, and 3 dB angles, with the transmit beams organized as separate radar sessions. For radar session 0001, a PRS waveform is specified, with a boresight angle of +25° and a 3 dB angle of 30°. For radar session 0002, a PRS waveform is specified, with a boresight angle of +25° and a 3 dB angle of 20°. For radar session 0003, a PRS waveform is specified, with a boresight angle of +25° and a 3 dB angle of 10°. Thus, the transmit beams maintain the same boresight angle while progressively narrowing the beam width, by successively decreasing the 3 dB angle over the three radar sessions. This may correspond, for example, to the situation described in FIG. 10, in which the transmit beams 1002, 1004, and 1006 are kept at the same AoD, but their respectively beam widths are progressively narrowed.

FIG. 13B shows a top-down view of the three transmit beams configured for the same boresight angle and progressively narrower 3 dB angles. FIG. 13C shows the messaging of configuration parameters among the radar server 308 (or 310), the TX base station 202, and the RX base station 204. Here, the configuration parameters specified in FIG. 13A are sent from the radar server 308 (or 310) to the TX base station 202. As shown, the configuration parameters for all three sessions are sent in one instruction 1302, e.g., as a "hierarchical codebook," to specify the boresight angle and progressively narrowed 3 dB angles of the transmit beams for the three radar sessions. Alternatively, three separate instructions may be sent. For simplicity of illustration, FIG. 13A only shows the session ID, RS waveform, boresight angle, and 3 dB angle being specified. However, other configuration parameters such as those shown in FIGS. 4, 5, and 6, including TX and RX timing, radar signal center frequency, bandwidth, period, etc., may also be specified in the messaging depicted in FIG. 13C.

FIGS. 11A-C, 12A-C, and 13-C all illustrate beam configuration as dictated by the radar server 308 (or 310). However, in some instances, it may be advantageous for the TX base station 202 or RX base station 204 to provide feedback and input to modify the beam configuration parameters. For instance, the TX base station 202 or the RX base station 204 may become aware of better or worse signal propagation and/or RF sensing conditions for certain angles or regions in the field of view of the radar system. In such cases, better performance may be achieved by making an adjustment in the boresight angle and/or 3 dB angle of certain transit beams or receive beams. According to certain embodiments of the disclosure, the TX base station 202 and RX base station 204 may provide such feedback. For example, the radar server 308 (or 310) may send a set of instructions to the TX base station 202, specifying certain boresight angles and 3 dB angles for certain transmit beams. In response, the TX base station 202 may derive revised boresight angles and/or 3 dB angles for those transmit beams, implement the revised boresight angles and/or 3 dB angles, and report back to the radar server 308 (or 310) regarding the modifications made. Such a scenario is depicted in FIGS. 14A-C. Additionally or alternatively, similar feedback and revision of beam parameters may occur on receive side. The RX base station 204 may derive revised boresight angles and/or 3 dB angles for receive beams that are different from those initially instructed by the radar server 308 (or 310). The RX base station 204 may implement the revised boresight angles and/or 3 dB angles and report back to the radar server 308 (or 310) regarding the modifications made. Such a scenario is depicted later in FIGS. 16A-C.

FIGS. 14A, 14B, and 14C illustrate actual operation of three transmit beams configured based on revised parameters provided by the TX base station 202. Following the intent of FIGS. 13A-C, the boresight angles are kept relatively constant, and the 3 dB angles are made progressively narrower, for the three transmit beams. However, to improve performance, the TX base station 202 has made slight variations to the boresight angles and 3 dB angles of the transmit beams, in order to account for different signal propagation conditions for different angles or regions in the field of view. Generally speaking, to compensate for poorer signal propagation conditions, the beam width may be narrowed to focus power into a smaller region. On the other hand, if better signal propagation conditions are sensed, the beam width may be broadened to distribute available power over a wider coverage area. The direction of the transmit signal may be modified by the TX base station 202, as well. For example, the optimal boresight direction for a transmit beam to reach a cover area might change if the shape of the cover area changes—e.g., as result of neighboring transmit beams changing their beam widths and/or boresight directions in a dynamic fashion. Such modified configurations may be specified in a revised "hierarchical codebook" provided by the TX base station 202.

Returning to FIG. 14A, the figure shows the modified configuration of the three transmit beams as reference signals (RS) with specified waveforms, boresight angles, and 3 dB angles, with the transmit beams organized as separate radar sessions. For radar session 0001, a PRS waveform is specified, with a boresight angle of +22° and a 3 dB angle of 31°. For radar session 0002, a PRS waveform is specified, with a boresight angle of +23° and a 3 dB angle of 20°. For radar session 0003, a PRS waveform is specified, with a boresight angle of +22° and a 3 dB angle of 12°. Thus, the transmit beams generally attempt to maintain the same boresight angle while progressively narrowing the beam width, by successively decreasing the 3 dB angle over the three radar sessions. This is in keeping with the intent of the beam coordination scenario described in FIG. 10, in which the transmit beams 1002, 1004, and 1006 are kept at the same AoD, but their respectively beam widths are progressively narrowed. However, the TX base station 202 has specified slightly different boresight angles and 3 dB angles, as compared to FIG. 13A FIG. 14B shows a top-down view of the three transmit beams configured for the modified boresight angles and progressively narrower 3 dB angles. FIG. 14C shows the messaging of revised configuration parameters among the radar server 308 (or 310), the TX base station 202, and the RX base station 204. Here, the revised configuration parameters specified in FIG. 14A are sent from the TX base station 202 to the radar server 308 (or 310). As shown, the configuration parameters for all three sessions are sent in one instruction 1402, e.g., as a revised "hierarchical codebook." Alternatively, three separate instructions may be sent. For simplicity of illustration, FIG. 14A only shows the session ID, RS waveform, boresight angle, and 3 dB angle being specified. However, other configuration parameters such as those shown in FIGS. 4, 5, and 6, including TX and RX timing, radar signal center frequency, bandwidth, period, etc., may also be specified as revised figures in the messaging depicted in FIG. 14C. While not depicted in the figures, the RX base station 204 may also derive and implement revised parameters such as modified boresight angles and 3 dB angles for receive beams.

FIGS. 15A, 15B, and 15C illustrate three receive beams configured for the same boresight angle and progressively narrower 3 dB angles. Such configurations may be specified in a "hierarchical codebook," as discussed previously. FIG. 15A shows the configuration of the three receive beams as reference signals (RS) with specified waveforms, boresight angles, and 3 dB angles, with the receive beams organized as separate radar sessions. For radar session 0001, a PRS waveform is specified, with a boresight angle of −45° and a 3 dB angle of 30°. For radar session 0002, a PRS waveform is specified, with a boresight angle of −45° and a 3 dB angle of 20°. For radar session 0003, a PRS waveform is specified, with a boresight angle of −45° and a 3 dB angle of 10°. Thus, the receive beams maintain the same boresight angle while progressively narrowing the beam width, by successively decreasing the 3 dB angle over the three radar sessions. This may correspond, for example, to the situation described in FIG. 10, in which the receive beams 1012, 1014, and 1016 are kept at the same AoD, but their respectively beam widths are progressively narrowed.

FIG. 15B shows a top-down view of the three receive beams configured for the same boresight angle and progressively narrower 3 dB angles. FIG. 15C shows the messaging of configuration parameters among the radar server 308 (or 310), the TX base station 202, and the RX base station 204. Here, the configuration parameters specified in FIG. 15A are sent from the radar server 308 (or 310) to the RX base station 204. As shown, the configuration parameters for all three sessions are sent in one instruction 1502, e.g., as a "hierarchical codebook," to specify the boresight angle and progressively narrowed 3 dB angles of the receive breams for the three radar sessions. Alternatively, three separate instructions may be sent. For simplicity of illustration, FIG. 15A only shows the session ID, RS waveform, boresight angle, and 3 dB angle being specified. However, other configuration parameters such as those shown in FIGS. 4, 5, and 6, including TX and RX timing, radar signal center frequency, bandwidth, period, etc., may also be specified in the messaging depicted in FIG. 15C.

FIGS. 16A, 16B, and 16C illustrate actual operation of three receive beams configured based on revised parameters provided by the RX base station 204. Following the intent of FIGS. 15A-C, the boresight angles are kept relatively constant, and the 3 dB angles are made progressively narrower, for the three receive beams. However, to improve performance, the RX base station 204 has made slight variations to the boresight angles and 3 dB angles of the receive beams, in order to account for different reception conditions for different angles or regions in the field of view. Generally speaking, to compensate for poorer reception conditions, the beam width may be narrowed to focus receptive power/gain into a smaller region. On the other hand, if better signal reception conditions are sensed, the beam width may be broadened to distribute power/gain over a wider coverage area. The direction of the receive signal may be modified by the RX base station 204, as well. For example, the optimal boresight direction for a receive beam for a cover area might change if the shape of the cover area changes—e.g., as result of neighboring receive beams changing their beam widths and/or boresight directions in a dynamic fashion. Such modified configurations may be specified in a revised "hierarchical codebook" provided by the RX base station 204.

Returning to FIG. 16A, the figure shows the modified configuration of the three receive beams as reference signals (RS) with specified waveforms, boresight angles, and 3 dB angles, with the receive beams organized as separate radar sessions. For radar session 0001, a PRS waveform is specified, with a boresight angle of −48° and a 3 dB angle of 33°. For radar session 0002, a PRS waveform is specified, with a boresight angle of −47° and a 3 dB angle of 22°. For radar session 0003, a PRS waveform is specified, with a boresight angle of −48° and a 3 dB angle of 12°. Thus, the receive beams generally attempt to maintain the same boresight angle while progressively narrowing the beam width, by successively decreasing the 3 dB angle over the three radar sessions. This is in keeping with the intent of the beam coordination scenario described in FIG. 10, in which the receive beams 1012, 1014, and 1016 are kept at the same AoA, but their respectively beam widths are progressively narrowed. However, the RX base station 204 has specified slightly different boresight angles and 3 dB angles, as compared to FIG. 15A FIG. 16B shows a top-down view of the three receive beams configured for the modified boresight angles and progressively narrower 3 dB angles. FIG. 16C shows the messaging of revised configuration parameters among the radar server 308 (or 310), the TX base station 202, and the RX base station 204. Here, the revised configuration parameters specified in FIG. 16A are sent from the RX base station 204 to the radar server 308 (or 310). As shown, the configuration parameters for all three sessions are sent in one instruction 1602, e.g., as a revised "hierarchical codebook." Alternatively, three separate instructions may be sent. For simplicity of illustration, FIG. 16A only shows the session ID, RS waveform, boresight angle, and 3 dB angle being specified. However, other configuration parameters such as those shown in FIGS. 4, 5, and 6, including TX and RX timing, radar signal center frequency, bandwidth, period, etc., may also be specified as revised figures in the messaging depicted in FIG. 16C.

Having described some fundamental techniques by which the radar server 308 (or 310) may flexibly coordinate with the TX base station 202 and the RX base station 204 to control TX and RX beam characteristics, such as angle of departure (AoD), angle of arrival (AoA), and beam width, some examples are provided below for utilizing such beam coordination techniques for implementing efficient RF sensing operations.

Figure 17:
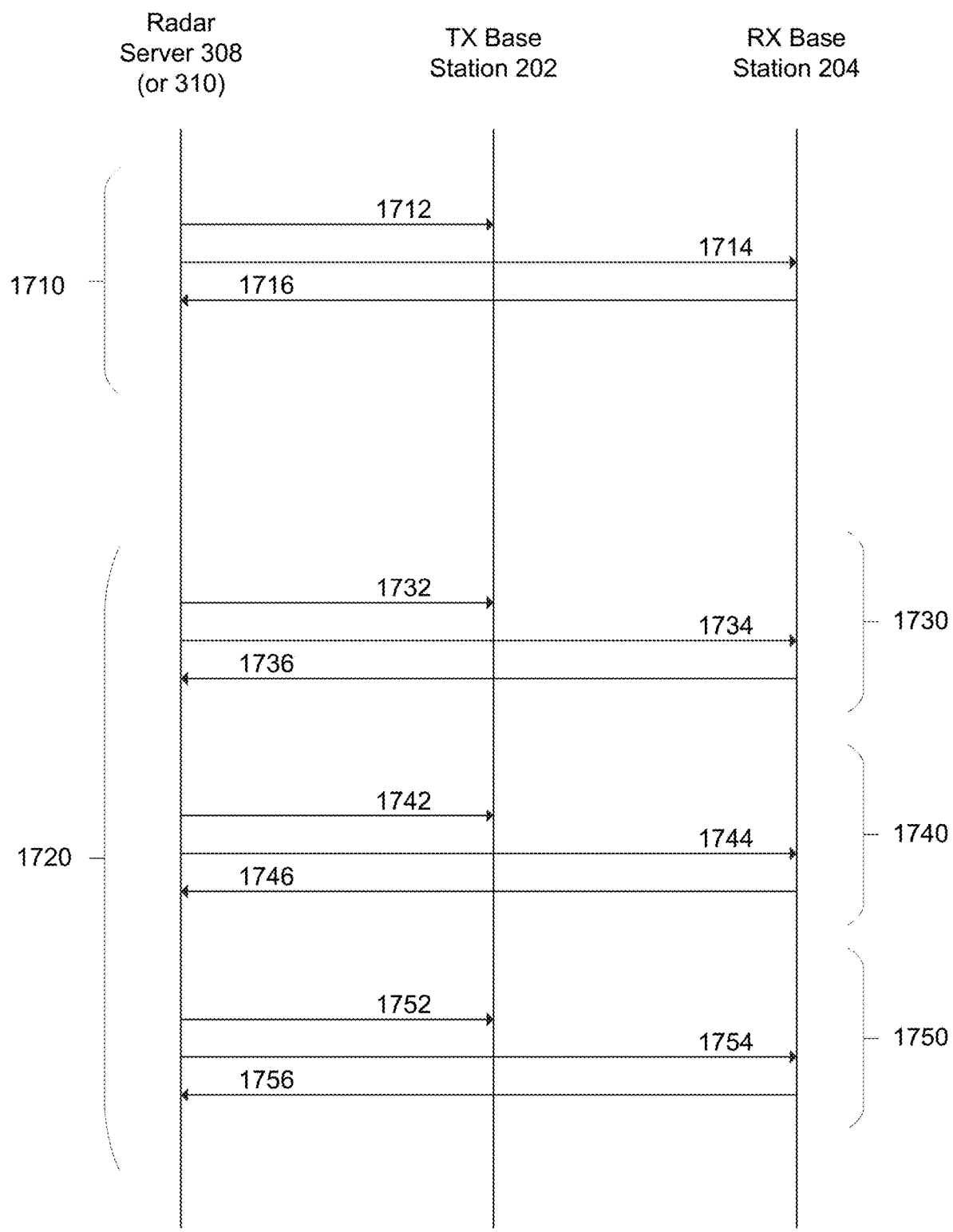
FIG. 17 illustrates a two-state approach for obtaining rough and refined radar measurements for a bistatic or multi-static radar system based on cellular communications system, according to an embodiment of the present disclosure.

FIG. 17 illustrates a two-state approach for obtaining rough and refined radar measurements for a bistatic or multi-static radar system based on cellular communications system, according to an embodiment of the present disclosure. In a first stage 1710, wide-angle beams may be used to detect targets. For example, the radar server 308 (or 310) may send a message 1712 to the TX base station 202 to convey parameters for configuring one or more wide-angle TX beams. Similarly, the radar server 308 (or 310) may send a message 1714 to the RX base station 204 to convey parameters for configuring one or more wide-angle RX beams. The wide-angle TX and RX beams allow for an overall coverage area to be scanned using fewer beams. This may allow the bistatic or multi-static radar system to quickly detect targets within the field of view. Here, "target" may refer to actual target objects such as vehicles, pedestrians, etc. "Target" may also refer to particular geographic points or reference points, such as a certain area of focus in a coverage area.

The RX base station 204 may report back results 1716 of the radar operation to the radar server 308 (or 310). The results may comprise raw radar data, such as range Fast Fourier Transform (FFT) data, Doppler FFT data, and/or angle-of-arrival (AoA) FFT data. Alternatively or additionally, the results may comprise further processed information such as range or location information, velocity information, and/or AoA information pertaining to detected targets. In addition, the RX base station may send additional measurement data such as a time-stamp, reference signal identification number (RS ID) used, signal-to-noise ration (SNR), reference signal received power (RSRP), quality metric associated with the time-of-arrival (TOA) or range measurement, quality metric associated with the Doppler shift estimate, etc.

In a second stage 1720, narrower-angle beams may be used to obtain more refined radar measurements for one or more of the detected targets. For example, a sequence of messages 1730 may be conducted to facilitate more refined radar measurements for a detected target, A. The radar server 308 (or 310) may send a message 1732 to the TX base station 202 to convey parameters for configuring one or more narrower-angle TX beams. The radar server 308 (or 310) may send a message 1734 to the RX base station 204 to convey parameters for configuring one or more narrower-angle RX beams. The narrower-angle TX and RX beams facilitate more refined radar measurements to be made. The narrower-angled beams may be employed in the second stage 1720, because specific targets have been detected and their approximate locations are known. Once the more refined radar measurements are completed, the RX base station 204 may report back result 1736 of the measurements to the radar sever 308 (or 310). The results may comprise raw data or computed information regarding the detected target A.

Similar operations may be performed concurrently or sequentially for other detected targets. For example, a sequence of messages 1740 may be conducted to facilitate more refined radar measurements for a detected target, B. The radar server 308 (or 310) may send messages 1742 and 1744 to the TX base station 202 and RX base station 204, respectively, to configure narrower-angle TX and RX beams for obtaining more refined radar measurements relating to the detected target B. Once the measurements are made, the RX base station may report results 1746 back to the radar server 308 (or 310).

A sequence of messages 1750 may be conducted to facilitate more refined radar measurements for a detected target, C. The radar server 308 (or 310) may send messages 1752 and 1754 to the TX base station 202 and RX base station 204, respectively, to configure narrower-angle TX and RX beams for obtaining more refined radar measurements relating to the detected target C. Once the measurements are made, the RX base station may report results 1756 back to the radar server 308 (or 310).

In some scenarios, the system may be guided to scan a specific target area, then beam direction and beam width can be dynamically configured according to the geometry of the target area. For example, the radar server 308 (or 310) may estimate the optimal or near optimal beam direction and beam width to cover the target area with sufficient signal-to-noise ratio (SNR). Then, radar server 308 (or 31) may guide the TX base station 202 and RX base station 204 send and receive transmit and receive beam with the estimated beam width(s). Generally speaking, narrower beams and/or an increased alignment between the TX and RX beam direction may have a disadvantage of a smaller coverage area for a one-time measurement but may be associated with an advantage of having a higher received signal strength. Thus, the radar server 308 (or 310) may balance a tradeoff. On the other hand, wider beams and/or a decreased alignment between the TX and RX beams may have an advantage of a larger coverage area for a one-time measurement but may be associated with the disadvantage of having a lower received signal power. The radar server 308 (or 310) may balance these concerns in selecting the optimal or near optimal beam direction, beam width, and/or other beam parameters.

According to certain embodiments, the TX base station 202 may autonomously make a request to the radar server 308 (or 310) for obtaining radar measurements for one or more directions within the field of view. Similarly, the RX base station 204 may autonomously make a request to the radar server 308 (or 310) for obtaining radar measurements for one or more directions within the field of view. In some embodiments, the radar server 308 (or 310) may inform the TX base station 202 and/or RX base station 204 of the approximate location of a set of targets to be tracked. The radar server 308 (or 310) may provide very little or no assistance beyond identifying the locations of the targets. The radar server 308 (or 310) may also specify what measurements to report (e.g., range only, range/Doppler/angle, etc.) and/or how often to report measurements. In response, the TX base station 202 and RX base station 204 may autonomously determine what TX and RX beams to use (e.g., beam angle, beam width, waveform, frequency, bandwidth, etc.) and coordinate the transmission and reception of the TX and RX beams with one another. In yet other embodiments, the RX base station 204 may report radar measurement results (e.g., range, Doppler, angle, etc.) to the radar server 308 (or 310), on an on-demand basis or periodically once instructed.

Measurement Reporting

According to various embodiments of the disclosure, the RX base station 204 may report on results of radar measurements. These measurements may relate to the estimated range, Doppler frequency, and/or angle-of-arrival (AoA) of targets within the field of view of the bistatic or multi-static radar system implemented using the cellular communications system 200. According to certain embodiments, the radar server 308 (or 310) may send feedback information to the TX base station 202 and/or RX base station 204, to enhance target detection performance of the RX base station 204. Such feedback information may include various parameters relating to TX and RX timing, beam configuration such as beam direction and beam pattern, etc., as discussed herein. Such feedback information can also include configuration parameters for focusing on certain points or regions, based on data such as prior detection events, known landmarks, known obstructions, etc. The RX base station 204 may generate one or more measurement reports containing one or more of delay (range), Doppler frequency, or angle-of-arrival information derived from receiving the echo signal. The RX base station 204 may be configured to send the one or more measurement reports to an entity within the cellular communication system 200. In various embodiments described below, the measurement reports are sent to the radar server 308 (or 310). Additionally or alternatively, the measurement reports may be sent to other entities within the cellular communications system 200, such as other base stations.

Range estimates may be reported in a variety of ways. In one embodiment, measurements of the time difference $T_{Rx\_LOS} - T_{Rx\_echo}$ may be reported. This time difference corresponds to the difference between the time of reception of the echo signal 210 and the time of reception of the LOS signal 212. Such a time difference may be expressed as $T_{Rx\_LOS} - T_{Rx\_echo}$.

As discussed previously, the RX base station 204 may obtain estimates of this time difference by cross-correlating the received LOS signal 212 with the received echo signal 210, such as by mixing the two signals in analog or digital form. The actual target range $R_R$, which represents the distance from the RX base station 204 to the target 106, can readily be calculated by using the relationship expressed in Eq. 3, discussed previously. The calculation takes into account the distance L between the TX base station 202 and the RX base station 204, as well as the angle of arrival $\theta_R$ of the echo signal 210. The distance L and the angle $\theta_R$ may be known locally at the RX base station 204 and/or at the radar server 308 (or 310). Thus, calculation for the target range $R_R$ may be performed at the RX base station 204 or at the radar server 308 (or 310).

Measurements of the Doppler shift $f_D$ and the AoA estimation angle $\theta_R$ may also be reported in different ways. The AoA estimation angle $\theta_R$ may be estimated using the antenna array employed to receive the echo signal 210 at the RX base station 204. For a bistatic radar system, the AoA estimation angle $\theta_R$ may need to be reported. For a multi-static radar system, it may not be necessary to report the angle $\theta_R$. Instead, the angle $\theta_R$ may be determined by multilateration, by intersecting multiple ellipsoid surfaces/curves computed from the multi-static radar system, as discussed previously. Such multilateration calculations may be performed, for example, at the radar server 308 (or 310).

FIG. 18 presents examples of bundled measurement reports for three targets, according to an embodiment of the disclosure. In this embodiment, measurements for each target are be bundled together. For example, for each target, a set of different measurements, including (1) the $T_{Rx\_LOS}-T_{Rx\_echo}$ measurement, (2) the $\theta_R$ measurement, and (3) the $f_D$ measurement, may be bundled. Furthermore, a report may also include additional information such as (4) measurement time stamp and (5) measurement quality. The measurement time stamp may be made, e.g., based on a clock synchronized all entities of the cellular communications system 200. The measurement quality value may be used to help the system conduct post-processing to enhance estimation accuracy and robustness.

The report shown in FIG. 18 only includes estimated values for the range, Doppler shift, and AoA measurements. In practice, these estimated values may be derived from received power measurements computed based on various forms of processing performed on the received echo signal 210. Such processing includes, for example, a range Fourier Fast Transform (FFT), a Doppler FFT, and an AoA FFT. The multi-dimensional data set derived from processing the receive echo signal 210 results in a delay/Doppler/angle joint profile. Various reports on the joint profile may be generated and sent from the RX base station 204 to the radar server 308 (or 310).

Figure 19:
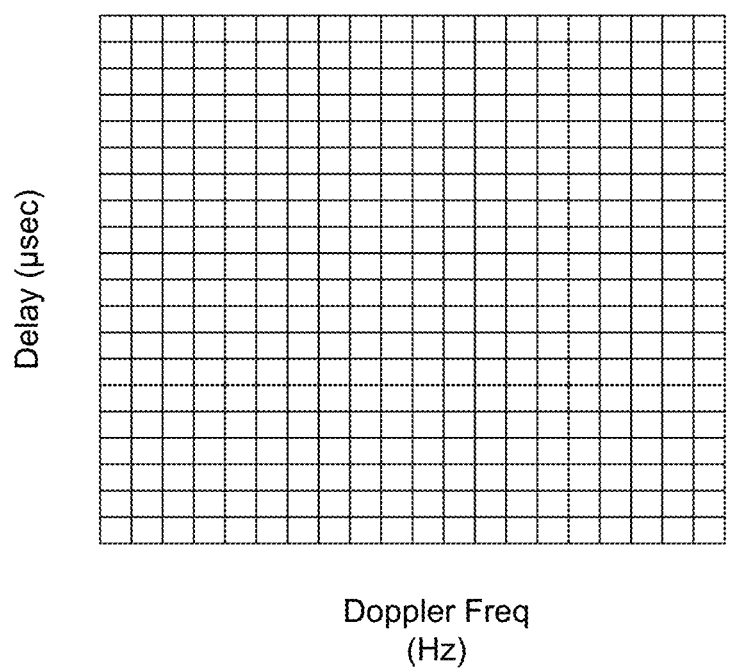
FIG. 19 depicts a quantized delay/Doppler power profile report, according to an embodiment of the disclosure.

FIG. 19 depicts a quantized delay/Doppler power profile report, according to an embodiment of the disclosure. The report may be two-dimensional in nature, and it is composed of cells arranged in rows and columns. As shown, the columns of the report represent different bins of the Doppler frequency. The rows of the report represent different bins of the delay, e.g., $T_{Rx\_LOS}-T_{Rx\_echo}$ or $T_{Rx\_echo}$. Each cell includes a power value associated with the amount of power that is received within that particular cell (i.e., that particular delay bin and Doppler frequency bin) from the echo signal 210. Each power value may be expressed as an absolute power measure (e.g., dbM) or a relative power measure (e.g., dB) that is compared to a reference level. The power values of the two-dimensional grid may be reported from the RX base station 204 to the radar server 308 (or 310) as the quantized delay/Doppler power profile report.

Figure 20:
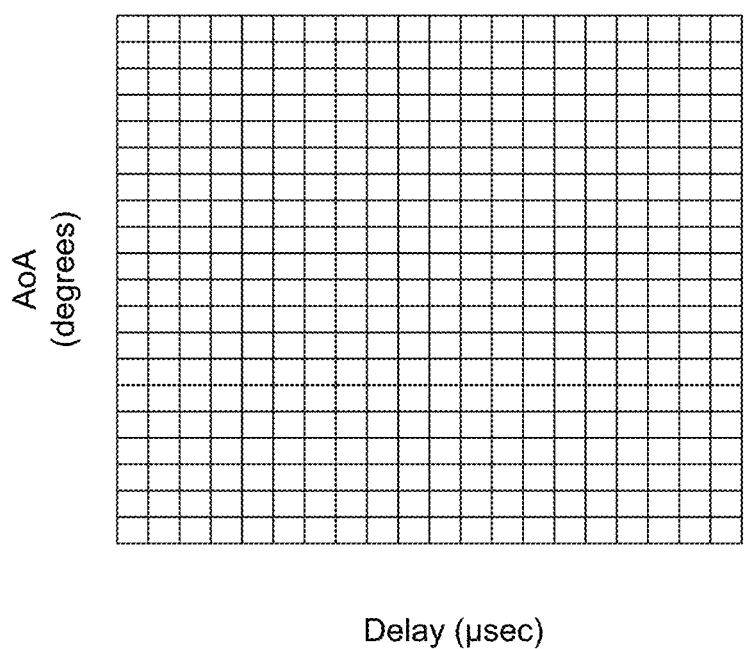
FIG. 20 depicts an angle-of-arrival (AoA)/delay power profile report.

FIG. 20 depicts an angle-of-arrival (AoA)/delay power profile report, according to an embodiment of the disclosure. This report may also be two-dimensional in nature and composed of cells arranged in rows and columns. As shown, the columns of the report represent different bins of the delay, e.g., $T_{Rx\_LOS}-T_{Rx\_echo}$ or $T_{Rx\_echo}$. The rows of the report represent different bins of the angle-of-arrival (AoA). Each cell includes a power value associated with the amount of power that is received within that particular cell (i.e., that particular AoA bin and delay bin) from the echo signal 210. Each power value may be expressed as an absolute power measure (e.g., dbM) or a relative power measure (e.g., dB) that is compared to a reference level. The power values of the two-dimensional grid may be reported from the RX base station 204 to the radar server 308 (or 310) as the quantized angle-of-arrival (AoA)/Delay power profile report.

Figure 21:
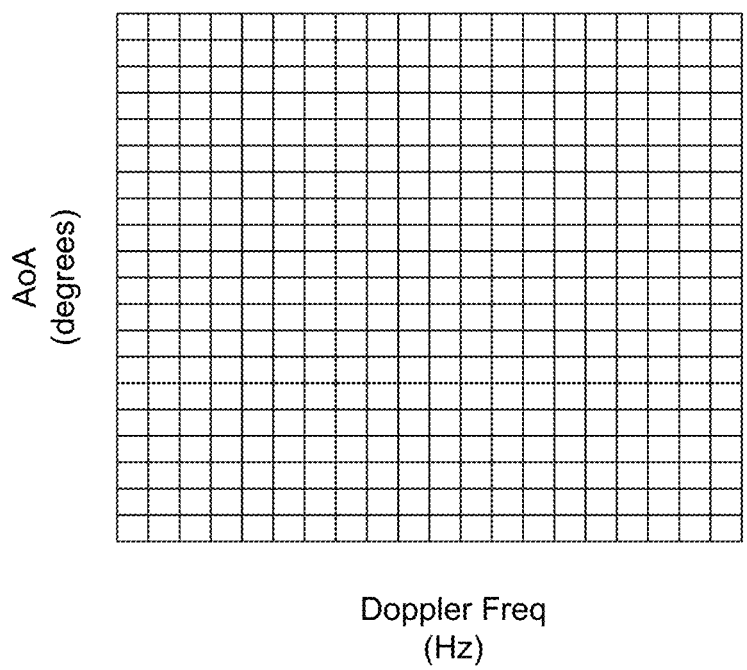
FIG. 21 depicts an angle-of-arrival (AoA)/Doppler power profile report.

FIG. 21 depicts an angle-of-arrival (AoA)/Doppler power profile report, according to an embodiment of the disclosure. This report may also be two-dimensional in nature and composed of cells arranged in rows and columns. As shown, the columns of the report represent different bins of the Doppler frequency. The rows of the report represent different bins of the angle-of-arrival (AoA). Each cell includes a power value associated with the amount of power that is received within that particular cell (i.e., that particular AoA bin and Doppler frequency bin) from the echo signal 210. Each power value may be expressed as an absolute power measure (e.g., dbM) or a relative power measure (e.g., dB) that is compared to a reference level. The power values of the two-dimensional grid may be reported from the RX base station 204 to the radar server 308 (or 310) as the quantized angle-of-arrival (AoA)/Doppler power profile report.

Figure 22:
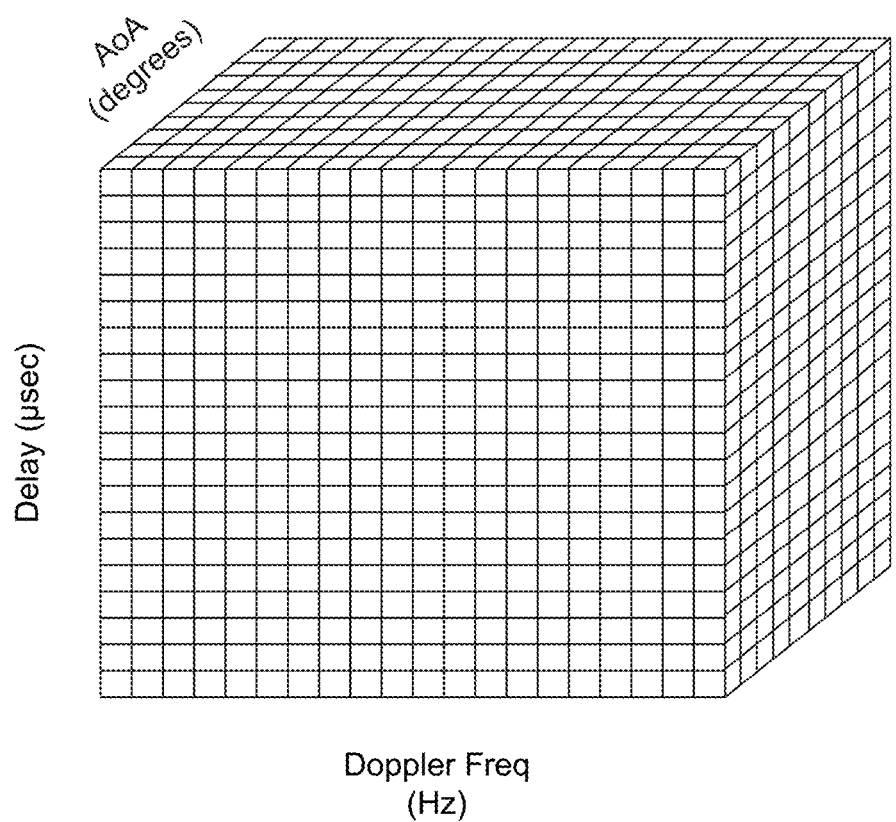
FIG. 22 depicts a quantized angle-of-arrival (AoA)/delay/Doppler power profile report.

FIG. 22 depicts a quantized angle-of-arrival (AoA)/delay/Doppler power profile report, according to an embodiment of the disclosure. The report may be three-dimensional in nature, and it is composed of cells arranged along three axes. As shown, a first axis of the report represents different bins of the Doppler frequency. A second axis represents different bins of the delay, e.g., $T_{Rx\_LOS}-T_{Rx\_echo}$ or $T_{Rx\_echo}$. A third axis represents different bins of the angle-of-arrival (AoA). Each cell includes a power value associated with the amount of power that is received within that particular cell (i.e., that particular delay bin, Doppler frequency bin, and AoA bin) from the echo signal 210. Each power value may be expressed as an absolute power measure (e.g., dbM) or a relative power measure (e.g., dB) that is compared to a reference level. The power values of the three-dimensional grid may be reported from the RX base station 204 to the radar server 308 (or 310) as the quantized AoA/delay/Doppler power profile report.

Figure 23:
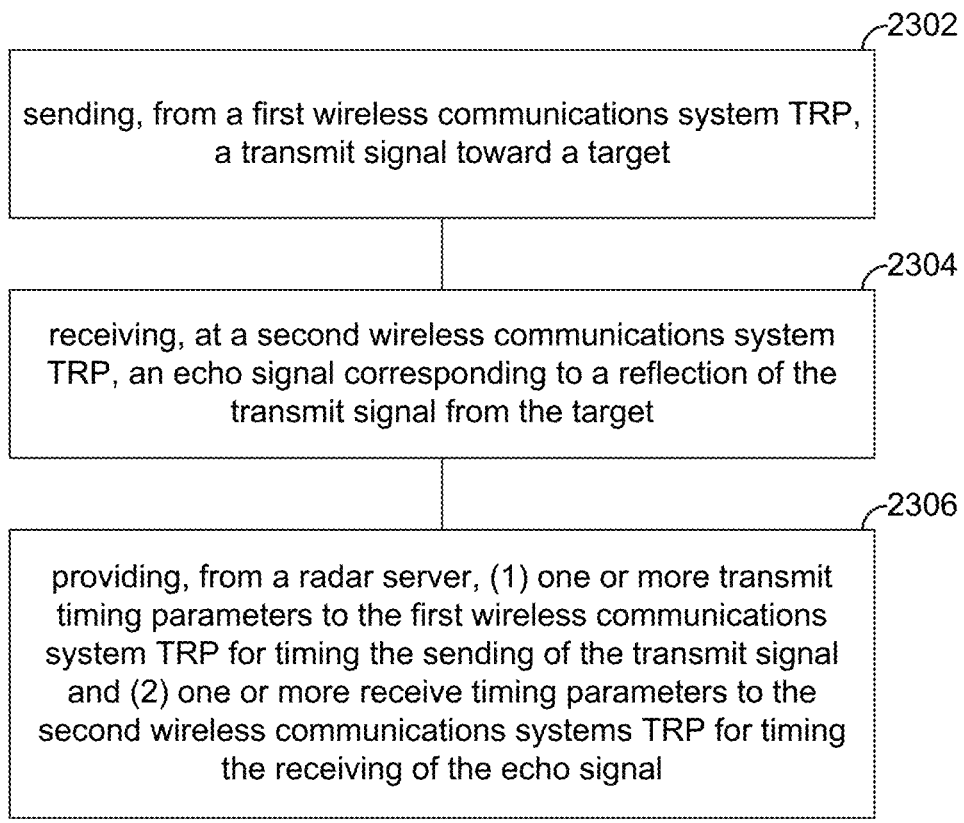
FIG. 23 is a flow diagram of a method 2300 relating to network signaling of TX and RX Parameters.

FIG. 23 is a flow diagram of a method 2300 relating to network signaling of TX and RX Parameters. Specifically, the method 2300 pertains to radar sensing, according to an embodiment. Means for performing the functionality illustrated in one or more of the blocks shown in FIG. 23 may be performed by hardware and/or software components of two or more Transmission Reception Points (TRPs) and a radar server. Example components of such a base station and radar server are illustrated in, e.g., FIGS. 28 and 29, which are described in more detail below.

Figure 26:
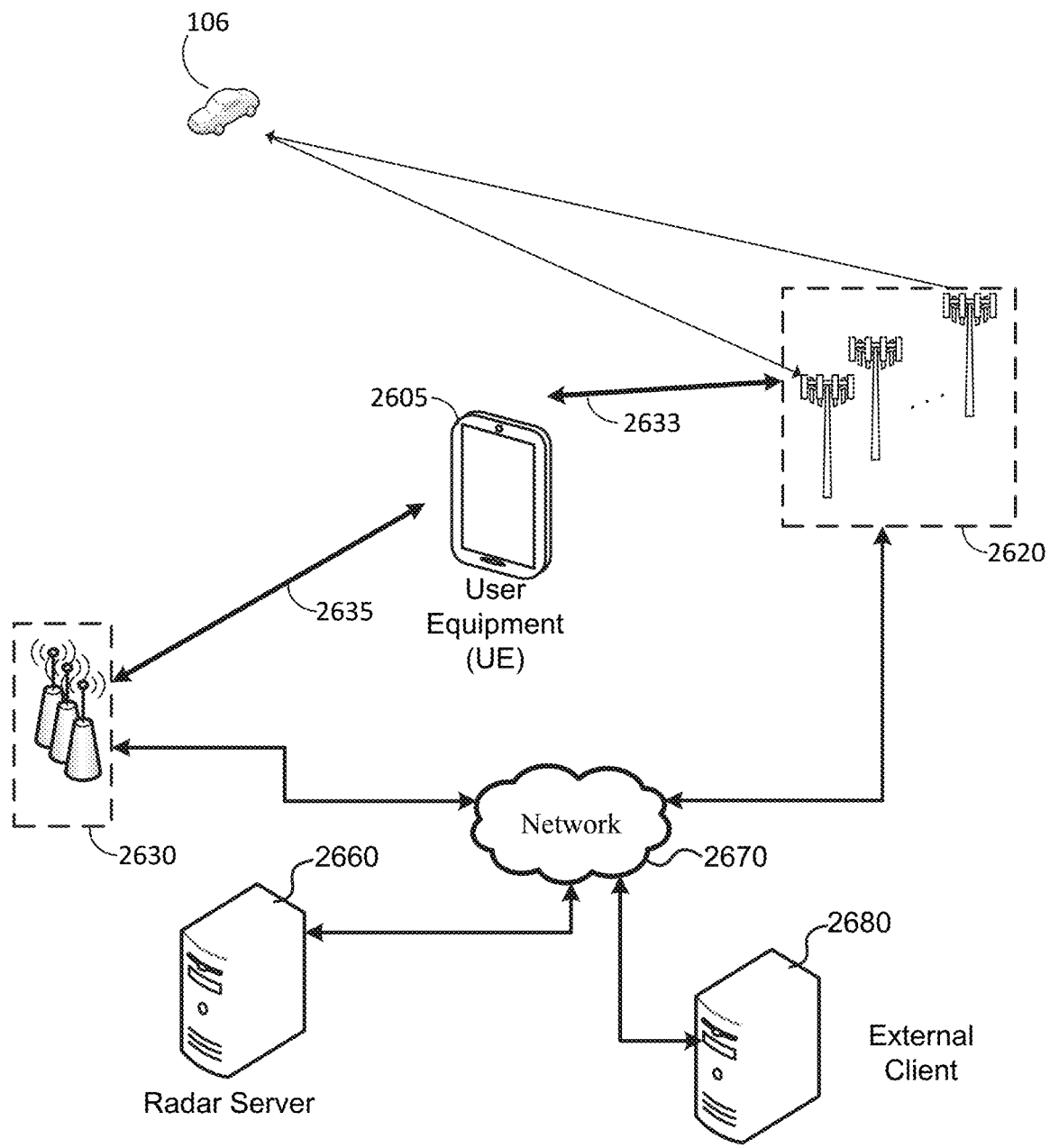
FIG. 26 is a simplified illustration of a cellular communications system in which two or more base stations may be used to perform bistatic or multi-static radar operations to senses one or more targets, according to an embodiment of the disclosure.

At block 2302, the functionality comprises sending, from a first wireless communications system Transmission Reception Point (TRP), a transmit signal toward a target. An example of such a first wireless communications system TRP is the base station 202. Means for performing functionality at block 2302 may comprise an antenna 2832 and/or other components of the base station 202 and/or 2620, as illustrated in FIGS. 2, 26, and/and 28, discussed below.

At block 2304, the functionality comprises receiving, at a second wireless communications system TRP, an echo signal corresponding to a reflection of the transmit signal from the target. An example of such a second wireless communications system TRP is the base station 204. Means for performing functionality at block 2304 may comprise an antenna 2832 and/or other components of the base station 204 and/or 2620, as illustrated in FIGS. 2, 26, and/or 28, discussed below.

At block 2306, the functionality comprises providing, from a radar server, (1) one or more transmit timing parameters to the first wireless communications system TRP for timing the sending of the transmit signal and (2) one or more receive timing parameters to the second wireless communications systems TRP for timing the receiving of the echo signal. Means for performing functionality at block 2306 may comprise a radar server 2660, and/or other components of a cellular communications system 200, 2600, and/or 2700, as illustrated in FIGS. 2, 26, and/or 27, discussed below.

Here, the first wireless communications system TRP and the second wireless communications system TRP are part of a wireless communications system. An example of such a wireless communications system may be the cellular communications system 2600 and/or the 5G NR cellular communications system 2700, discussed below.

Figure 24:
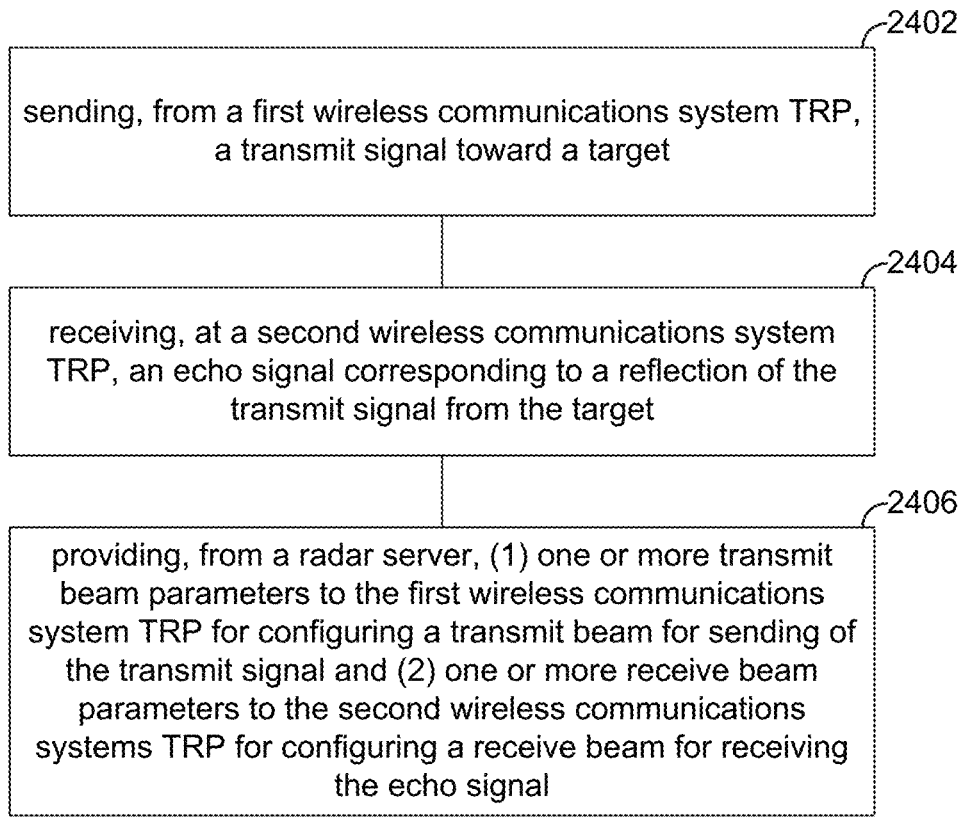
FIG. 24 is a flow diagram of a method 2400 relating to server-assisted beam coordination.

FIG. 24 is a flow diagram of a method 2400 relating to server-assisted beam coordination. Specifically, the method 2400 pertains to radar sensing, according to an embodiment. Means for performing the functionality illustrated in one or more of the blocks shown in FIG. 24 may be performed by hardware and/or software components of two or more TRPs and a radar server. Example components of such a base station and radar server are illustrated in, e.g., FIGS. 28 and 29, which are described in more detail below.

At block 2402, the functionality comprises sending, from a first wireless communications system TRP, a transmit signal toward a target. Means for performing functionality at block 2402 may comprise an antenna 2832 and/or other components of a base station 202 and/or 2620, as illustrated in FIGS. 2, 26, and/and 28, discussed below.

At block 2404, the functionality comprises receiving, at a second wireless communications system TRP, an echo signal corresponding to a reflection of the transmit signal from the target. Means for performing functionality at block 2404 may comprise an antenna 2832 and/or other components of a base station 204 and/or 2620, as illustrated in FIGS. 2, 26, and/or 28, discussed below.

At block 2406, the functionality comprises providing, from a radar server, (1) one or more transmit beam parameters to the first wireless communications system TRP for configuring a transmit beam for sending of the transmit signal and (2) one or more receive beam parameters to the second wireless communications systems TRP for configuring a receive beam for receiving the echo signal. Means for performing functionality at block 2406 may comprise a radar server 2660, and/or other components of a cellular communications system 200, 2600, and/or 2700, as illustrated in FIGS. 2, 26, and/or 27, discussed below.

Here, the first wireless communications system TRP and the second wireless communications system TRP are part of a wireless communications system. An example of such a wireless communications system may be the cellular communications system 2600 and/or the 5G NR cellular communications system 2700, discussed below.

Figure 25:
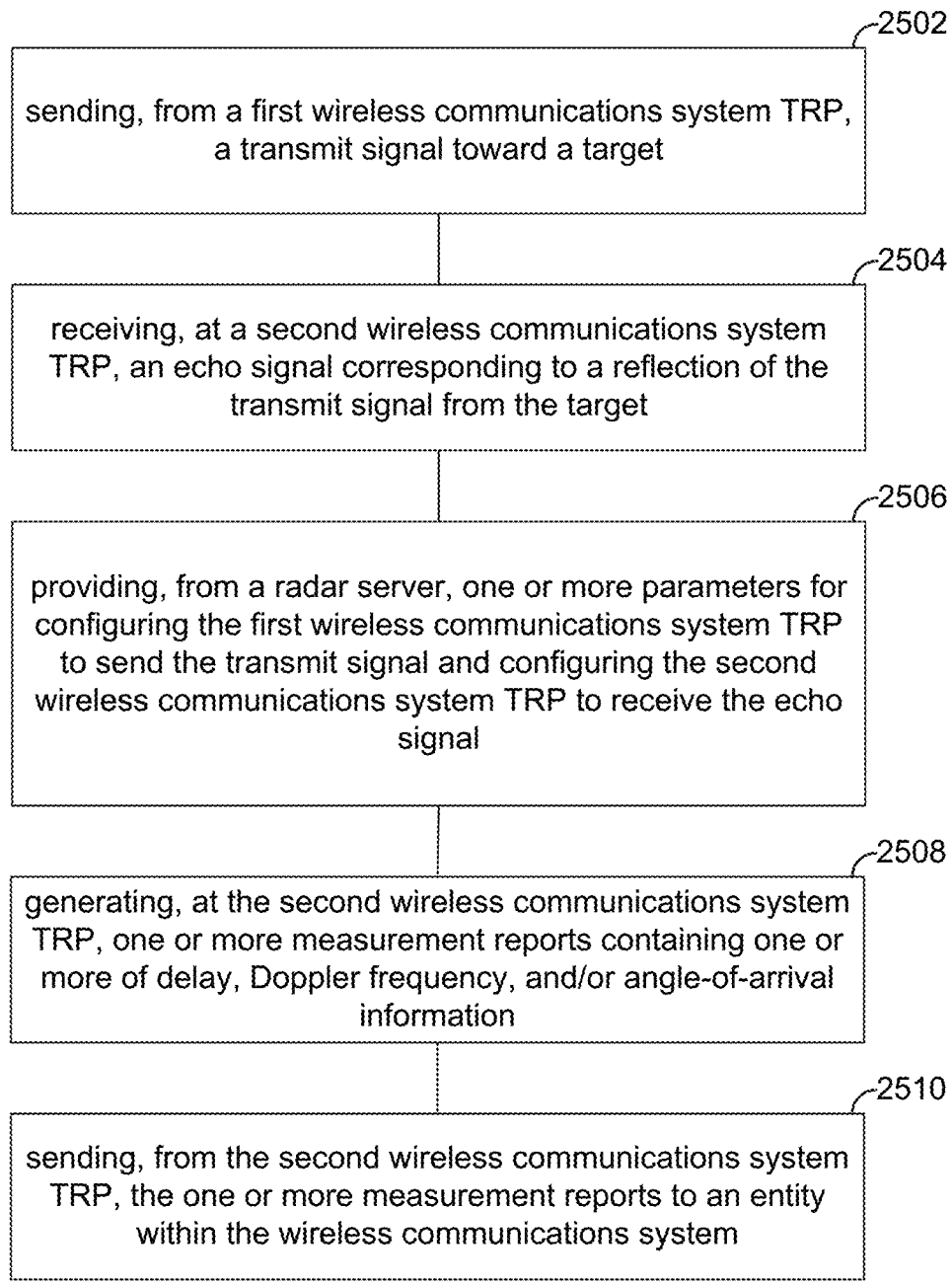
FIG. 25 is a flow diagram of a method 2300 relating to measurement reporting.

FIG. 25 is a flow diagram of a method 2300 relating to measurement reporting. Specifically, the method 2500 pertains to radar sensing, according to an embodiment. Means for performing the functionality illustrated in one or more of the blocks shown in FIG. 25 may be performed by hardware and/or software components of two or more TRPs and a radar server. Example components of such a base station and radar server are illustrated in, e.g., FIGS. 28 and 29, which are described in more detail below.

At block 2502, the functionality comprises sending, from a first wireless communications system TRP, a transmit signal toward a target. Means for performing functionality at block 2502 may comprise an antenna 2832 and/or other components of a base station 202 and/or 2620, as illustrated in FIGS. 2, 26, and/and 28, discussed below.

At block 2504, the functionality comprises receiving, at a second wireless communications system TRP, an echo signal corresponding to a reflection of the transmit signal from the target. Means for performing functionality at block 2504 may comprise an antenna 2832 and/or other components of a base station 204 and/or 2620, as illustrated in FIGS. 2, 26, and/or 28, discussed below.

At block 2506, the functionality comprises providing, from a radar server, one or more parameters for configuring the first wireless communications system TRP to send the transmit signal and configuring the second wireless communications system TRP to receive the echo signal. Means for performing functionality at block 2506 may comprise a radar server 2660, and/or other components of a cellular communications system 200, 2600, and/or 2700, as illustrated in FIGS. 2, 26, and/or 27, discussed below.

Figure 28:
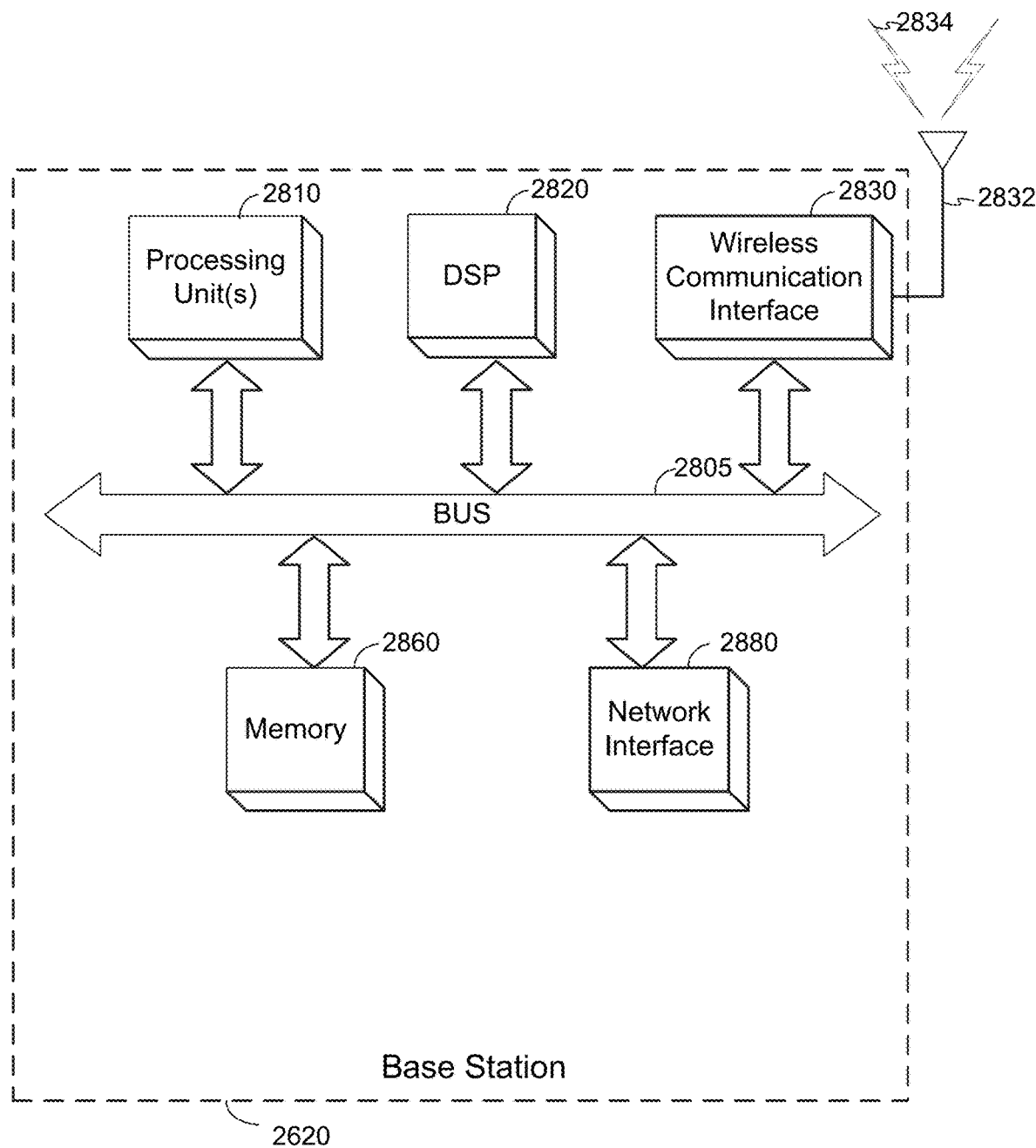
FIG. 28 illustrates an embodiment of a base station.

At block 2508, the functionality comprises generating, at the second wireless communications system TRP, one or more measurement reports containing one or more of delay, Doppler frequency, and/or angle-of-arrival information. Means for performing functionality at block 2508 may comprise a processing unit 2810, as illustrated in FIG. 28, discussed below.

At a block 2510, the functionality comprises sending, from the second wireless communications system TRP, the one or more measurement reports to an entity within the wireless communications system. Means for performing functionality at block 2504 may comprise an antenna 2832 and/or other components of a base station 204 and/or 2620, as illustrated in FIGS. 2, 26, and/or 28, discussed below.

Here, the first wireless communications system TRP and the second wireless communications system TRP are part of a wireless communications system. An example of such a wireless communications system may be the cellular communications system 2600 and/or the 5G NR cellular communications system 2700, discussed below.

FIG. 26 is a simplified illustration of a cellular communications system 2600 in which two or more base stations 2620 may be used to perform bistatic or multi-static radar operations to sense one or more targets 106, according to an embodiment of the disclosure. The cellular communication system 2600 is an embodiment of the cellular communications system 200 discussed previously in FIG. 2. Cellular communications system 2600 may comprise a UE 2605, base stations 2620, access points (APs) 2630, a radar server 2660, network 2670, external client 2680, and/or other components. A specific embodiment of the cellular communications system 2600 is discussed in more detail with regard to FIG. 27

The radar server 2660 may operate in a manner akin to a location server, in that the radar server may coordinate and manage radar operations within the cellular communications system 2600, much like a position server coordinates and manages position location operations within system 2600. Radar server 2660 is an example of the radar server 308 (or 310) discussed previously in FIG. 3.

It should be noted that FIG. 26 provides only a generalized illustration of various components, any or all of which may be utilized as appropriate, and each of which may be duplicated as necessary. Specifically, although only one UE 2605 is illustrated, it will be understood that many UEs (e.g., hundreds, thousands, millions, etc.) may utilize the cellular communications system 2600. Similarly, the cellular communications system 2600 may include a larger or smaller number of base stations 2620 and/or APs 2630 than illustrated in FIG. 26. The illustrated connections that connect the various components in the cellular communications system 2600 comprise data and signaling connections which may include additional (intermediary) components, direct or indirect physical and/or wireless connections, and/or additional networks. Furthermore, components may be rearranged, combined, separated, substituted, and/or omitted, depending on desired functionality. A person of ordinary skill in the art will recognize many modifications to the components illustrated.

Depending on desired functionality, the network 2670 may comprise any of a variety of wireless and/or wireline networks. The network 2670 can, for example, comprise any combination of public and/or private networks, local and/or wide-area networks, and the like. Furthermore, the network 2670 may utilize one or more wired and/or wireless communication technologies. In some embodiments, the network 2670 may comprise a cellular or other mobile network, a wireless local area network (WLAN), a wireless wide-area network (WWAN), and/or the Internet, for example. Examples of network 2670 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 2670 may also include more than one network and/or more than one type of network.

The base stations 2620 and access points (APs) 2630 are communicatively coupled to the network 2670. In some embodiments, the base station 2620s may be owned, maintained, and/or operated by a cellular network provider, and may employ any of a variety of wireless technologies, as described herein below. Depending on the technology of the network 2670, a base station 2620 may comprise a node B, an Evolved Node B (eNodeB or eNB), a base transceiver station (BTS), a radio base station (RBS), an NR NodeB (gNB), a Next Generation eNB (ng-eNB), or the like. A base station 2620 that is a gNB or ng-eNB may be part of a Next Generation Radio Access Network (NG-RAN) which may connect to a 5G Core Network (5GC) in the case that Network 2670 is a 5G network. An AP 2630 may comprise a Wi-Fi AP or a Bluetooth® AP, for example. Thus, UE 2605 can send and receive information with network-connected devices, such as LS 2660, by accessing the network 2670 via a base station 2620 using a first communication link 2633. Additionally or alternatively, because APs 2630 also may be communicatively coupled with the network 2670, UE 2605 may communicate with Internet-connected devices, including LS 2660, using a second communication link 2635.

As used herein, the term "base station" may generically refer to a single physical transmission point, or multiple co-located physical transmission points, which may be located at a base station 2620. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 2605 and a neighbor base station whose reference RF signals the UE 2605 is measuring.

As used herein, the term "cell" may generically refer to a logical communication entity used for communication with a base station 2620, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Figure 27:
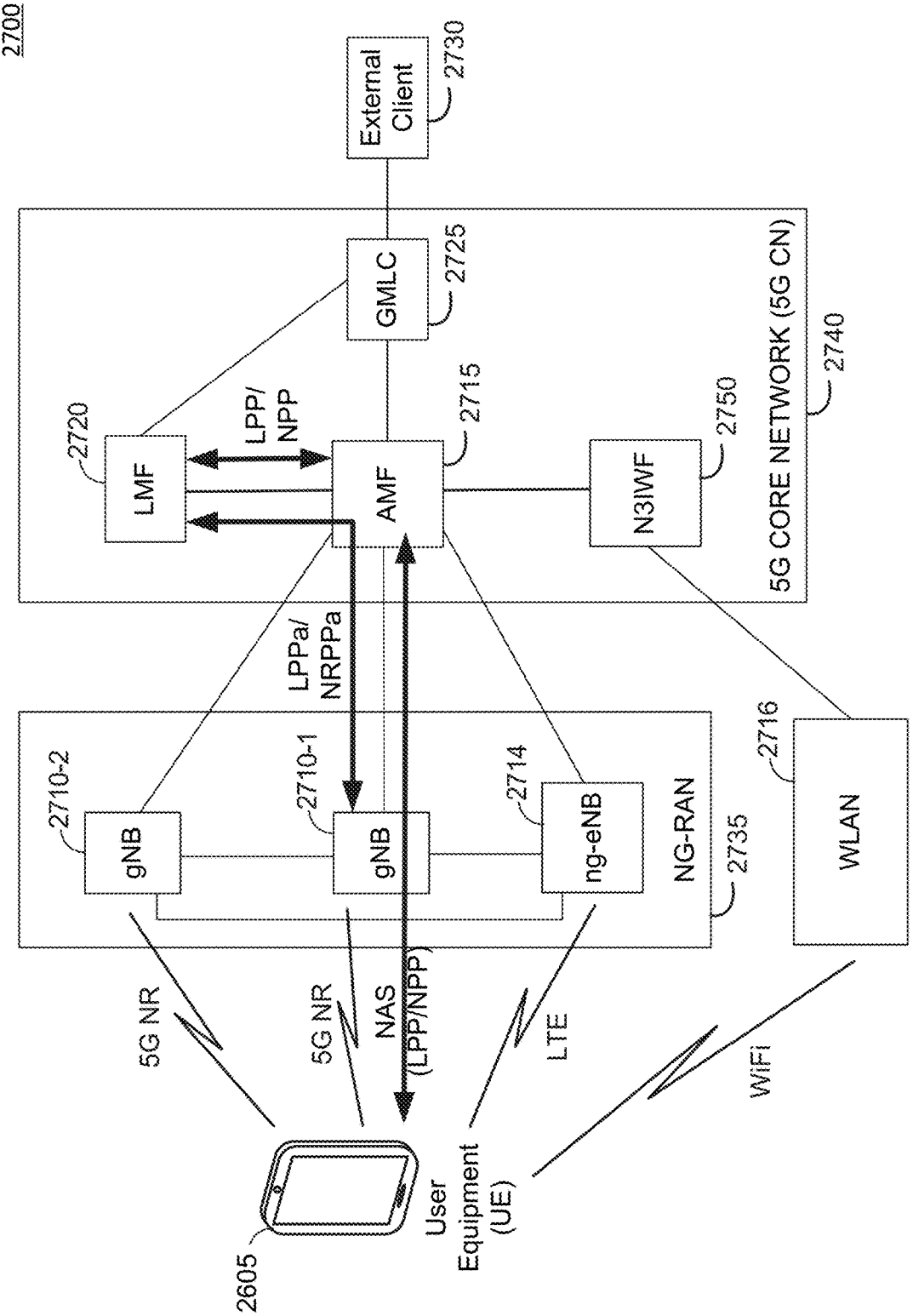
FIG. 27 shows a diagram of a 5G NR cellular communications system.

The cellular communications system 2600 can be implemented using a wireless communication network, such as an LTE-based or 5G NR-based network. FIG. 27 shows a diagram of a 5G NR cellular communications system 2700, illustrating an embodiment of the cellular communications system 2600 implementing 5G NR. Here, the 5G NR cellular communications system 2700 comprises a UE 2605, and components of the 5G NR network comprises a Next Generation (NG) Radio Access Network (RAN) (NG-RAN) 2735 and a 5G Core Network (5G CN) 2740. A 5G network may also be referred to as an NR network; NG-RAN 2735 may be referred to as a 5G RAN or as an NR RAN; and 5G CN 2740 may be referred to as an NG Core network. Standardization of an NG-RAN and 5G CN is ongoing in 3GPP. Accordingly, NG-RAN 2735 and 5G CN 2740 may conform to current or future standards for 5G support from 3GPP. Additional components of the 5G NR cellular communications system 2700 are described below. The κG NR cellular communications system 2700 may include additional or alternative components.

It should be noted that FIG. 27 provides only a generalized illustration of various components, any or all of which may be utilized as appropriate, and each of which may be duplicated or omitted as necessary. Specifically, although only one UE 2605 is illustrated, it will be understood that many UEs (e.g., hundreds, thousands, millions, etc.) may utilize the 5G NR cellular communications system 2700. Similarly, the 5G NR cellular communications system 2700 may include a larger (or smaller) number of GNSS satellites 2610, gNBs 2710, ng-eNBs 2714, Wireless Local Area Networks (WLANs) 2716, Access and Mobility Functions (AMF)s 2715, external clients 2730, and/or other components. The illustrated connections that connect the various components in the 5G NR cellular communications system 2700 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 2605 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 2605 may correspond to a cellphone, smartphone, laptop, tablet, personal data assistant (PDA), tracking device, navigation device, Internet of Things (IoT) device, or some other portable or moveable device. Typically, though not necessarily, the UE 2605 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 2735 and 5G CN 2740), etc. The UE 2605 may also support wireless communication using a WLAN 2716 which (like the one or more RATs, and as previously noted with respect to FIG. 26) may connect to other networks, such as the Internet. The use of one or more of these RATs may allow the UE 2605 to communicate with an external client 2730 (e.g., via elements of 5G CN 2740 not shown in FIG. 27, or possibly via a Gateway Mobile Location Center (GMLC) 2725) and/or allow the external client 2730 to receive location information regarding the UE 2605 (e.g., via the GMLC 2725).

Base stations in the NG-RAN 2735 shown in FIG. 27 may correspond to base stations 2620 in FIG. 26 and may include NR NodeB (gNB) 2710-1 and 2710-2 (collectively and generically referred to herein as gNBs 2710) and/or an antenna of a gNB. Pairs of gNBs 2710 in NG-RAN 2735 may be connected to one another (e.g., directly as shown in FIG. 27 or indirectly via other gNBs 2710). Access to the 5G network is provided to UE 2605 via wireless communication between the UE 2605 and one or more of the gNBs 2710, which may provide wireless communications access to the 5G CN 2740 on behalf of the UE 2605 using 5G NR. 5G NR radio access may also be referred to as NR radio access or as 5G radio access. In FIG. 27, the serving gNB for UE 2605 is assumed to be gNB 2710-1, although other gNBs (e.g. gNB 2710-2) may act as a serving gNB if UE 2605 moves to another location or may act as a secondary gNB to provide additional throughput and bandwidth to UE 2605.

Base stations in the NG-RAN 2735 shown in FIG. 27 may also or instead include a next generation evolved Node B, also referred to as an ng-eNB, 2714. Ng-eNB 2714 may be connected to one or more gNBs 2710 in NG-RAN 2735—e.g. directly or indirectly via other gNBs 2710 and/or other ng-eNBs. An ng-eNB 2714 may provide LTE wireless access and/or evolved LTE (eLTE) wireless access to UE 2605. Some gNBs 2710 (e.g. gNB 2710-2) and/or ng-eNB 2714 in FIG. 27 may be configured to function as positioning-only beacons which may transmit signals (e.g., Positioning Reference Signal (PRS)) and/or may broadcast assistance data to assist positioning of UE 2605 but may not receive signals from UE 2605 or from other UEs. It is noted that while only one ng-eNB 2714 is shown in FIG. 27, some embodiments may include multiple ng-eNBs 2714.

5G NR cellular communications system 2700 may also include one or more WLANs 2716 which may connect to a Non-3GPP InterWorking Function (N3IWF) 2750 in the 5G CN 2740 (e.g., in the case of an untrusted WLAN 2716). For example, the WLAN 2716 may support IEEE 802.11 Wi-Fi access for UE 2605 and may comprise one or more Wi-Fi APs (e.g., APs 2630 of FIG. 26). Here, the N3IWF 2750 may connect to other elements in the 5G CN 2740 such as AMF 2715. In some embodiments, WLAN 2716 may support another RAT such as Bluetooth. The N3IWF 2750 may provide support for secure access by UE 2605 to other elements in 5G CN 2740 and/or may support interworking of one or more protocols used by WLAN 2716 and UE 2605 to one or more protocols used by other elements of 5G CN 2740 such as AMF 2715. For example, N3IWF 2750 may support IPSec tunnel establishment with UE 2605, termination of IKEv2/IPSec protocols with UE 2605, termination of N2 and N3 interfaces to 5G CN 2740 for control plane and user plane, respectively, relaying of uplink and downlink control plane Non-Access Stratum (NAS) signaling between UE 2605 and AMF 2715 across an N1 interface. In some other embodiments, WLAN 2716 may connect directly to elements in 5G CN 2740 (e.g. AMF 2715 as shown by the dashed line in FIG. 27) and not via N3IWF 2750—e.g. if WLAN 2716 is a trusted WLAN for 5G CN 2740. It is noted that while only one WLAN 2716 is shown in FIG. 27, some embodiments may include multiple WLANs 2716.

Access nodes may comprise any of a variety of network entities enabling communication between the UE 2605 and the AMF 2715. This can include gNBs 2710, ng-eNB 2714, WLAN 2716, and/or other types of cellular base stations. However, access nodes providing the functionality described herein may additionally or alternatively include entities enabling communications to any of a variety of RATs not illustrated in FIG. 27, which may include non-cellular technologies. Thus, the term "access node," as used in the embodiments described herein below, may include but is not necessarily limited to a gNB 2710, ng-eNB 2714 or WLAN 2716.

As noted, while FIG. 27 depicts access nodes 2710, 2714, and 2716 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 2605, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 2735 and the EPC corresponds to 5G CN 2740 in FIG. 27. The methods and techniques described herein for UE 2605 positioning using common or generic positioning procedures may be applicable to such other networks.

The gNBs 2710 and ng-eNB 2714 can communicate with an AMF 2715, which, for positioning functionality, communicates with an LMF 2720. The AMF 2715 may support mobility of the UE 2605, including cell change and handover of UE 2605 from an access node 2710, 2714, or 2716 of a first RAT to an access node 2710, 2714, or 2716 of a second RAT. The AMF 2715 may also participate in supporting a signaling connection to the UE 2605 and possibly data and voice bearers for the UE 2605. The LMF 2720 may support positioning of the UE 2605 when UE 2605 accesses the NG-RAN 2735 or WLAN 2716 and may support positioning procedures and methods, including UE assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), ECID, angle of arrival (AOA), angle of departure (AOD), WLAN positioning, and/or other positioning procedures and methods. The LMF 2720 may also process location services requests for the UE 2605, e.g., received from the AMF 2715 or from the GMLC 2725. The LMF 2720 may be connected to AMF 2715 and/or to GMLC 2725. The LMF 2720 may be referred to by other names such as a Location Manager (LM), Location Function (LF), commercial LMF (CLMF), or value added LMF (VLMF). In some embodiments, a node/system that implements the LMF 2720 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 2605 (e.g., by processing downlink PRS (DL-PRS) signals transmitted by wireless nodes such as gNBs 2710, ng-eNB 2714 and/or WLAN 2716, and/or using assistance data provided to the UE 2605, e.g., by LMF 2720).

The Gateway Mobile Location Center (GMLC) 2725 may support a location request for the UE 2605 received from an external client 2730 and may forward such a location request to the AMF 2715 for forwarding by the AMF 2715 to the LMF 2720, or may forward the location request directly to the LMF 2720. A location response from the LMF 2720 (e.g., containing a location estimate for the UE 2605) may be similarly returned to the GMLC 2725 either directly or via the AMF 2715, and the GMLC 2725 may then return the location response (e.g., containing the location estimate) to the external client 2730. The GMLC 2725 is shown connected to both the AMF 2715 and LMF 2720 in FIG. 27 though only one of these connections may be supported by 5G CN 2740 in some implementations.

As further illustrated in FIG. 27, the LMF 2720 may communicate with the gNBs 2710 and/or with the ng-eNB 2714 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 2710 and the LMF 2720, and/or between an ng-eNB 2714 and the LMF 2720, via the AMF 2715. As further illustrated in FIG. 27, LMF 2720 and UE 2605 may communicate using the LPP protocol. LMF 2720 and UE 2605 may also or instead communicate using an LPP protocol (which, in NR, also may be referred to as NRPP or NPP). Here, LPP messages may be transferred between the UE 2605 and the LMF 2720 via the AMF 2715 and a serving gNB 2710-1 or serving ng-eNB 2714 for UE 2605. For example, LPP and/or LPP messages may be transferred between the LMF 2720 and the AMF 2715 using messages for service-based operations (e.g., based on the Hypertext Transfer Protocol (HTTP)) and may be transferred between the AMF 2715 and the UE 2605 using a 5G NAS protocol. The LPP and/or LPP protocol may be used to support positioning of UE 2605 using UE assisted and/or UE based position methods such as A-GNSS, RTK, OTDOA and/or Enhanced Cell ID (ECID). The LPPa protocol may be used to support positioning of UE 2605 using network based position methods such as ECID (e.g., when used with measurements obtained by a gNB 2710 or ng-eNB 2714) and/or may be used by LMF 2720 to obtain location related information from gNBs 2710 and/or ng-eNB 2714, such as parameters defining DL-PRS transmission from gNBs 2710 and/or ng-eNB 2714.

In the case of UE 2605 access to WLAN 2716, LMF 2720 may use LPPa and/or LPP to obtain a location of UE 2605 in a similar manner to that just described for UE 2605 access to a gNB 2710 or ng-eNB 2714. Thus, LPPa messages may be transferred between a WLAN 2716 and the LMF 2720, via the AMF 2715 and N3IWF 2750 to support network-based positioning of UE 2605 and/or transfer of other location information from WLAN 2716 to LMF 2720. Alternatively, LPPa messages may be transferred between N3IWF 2750 and the LMF 2720, via the AMF 2715, to support network-based positioning of UE 2605 based on location related information and/or location measurements known to or accessible to N3IWF 2750 and transferred from N3IWF 2750 to LMF 2720 using LPPa. Similarly, LPP and/or LPP messages may be transferred between the UE 2605 and the LMF 2720 via the AMF 2715, N3IWF 2750, and serving WLAN 2716 for UE 2605 to support UE assisted or UE based positioning of UE 2605 by LMF 2720.

FIG. 28 illustrates an embodiment of a base station 2620, which can be utilized as described herein above (e.g., in association with FIGS. 2, 3, 7-17, and 26). It should be noted that FIG. 28 is meant only to provide a generalized illustration of various components, any or all of which may be utilized as appropriate. In some embodiments, the base station 2620 may correspond to a gNB, an ng-eNB, and/or (more generally) a TRP.

The base station 2620 is shown comprising hardware elements that can be electrically coupled via a bus 2805 (or may otherwise be in communication, as appropriate). The hardware elements may include a processing unit(s) 2810 which can include without limitation one or more general-purpose processors, one or more special-purpose processors (such as DSP chips, graphics acceleration processors, ASICs, and/or the like), and/or other processing structure or means. As shown in FIG. 28, some embodiments may have a separate DSP 2820, depending on desired functionality. Location determination and/or other determinations based on wireless communication may be provided in the processing unit(s) 2810 and/or wireless communication interface 2830 (discussed below), according to some embodiments. The base station 2620 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 2620 might also include a wireless communication interface 2830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 2620 to communicate as described herein. The wireless communication interface 2830 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 2832 that send and/or receive wireless signals 2834.

The base station 2620 may also include a network interface 2880, which can include support of wireline communication technologies. The network interface 2880 may include a modem, network card, chipset, and/or the like. The network interface 2880 may include one or more input and/or output communication interfaces to permit data to be exchanged with a network, communication network servers, computer systems, and/or any other electronic devices described herein.

In many embodiments, the base station 2620 may further comprise a memory 2860. The memory 2860 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 2860 of the base station 2620 also may comprise software elements (not shown in FIG. 28), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 2860 that are executable by the base station 2620 (and/or processing unit(s) 2810 or DSP 2820 within base station 2620). In an aspect, then such code and/or instructions can be used to configure and/or adapt a general-purpose computer (or other device) to perform one or more operations in accordance with the described methods.

Figure 29:
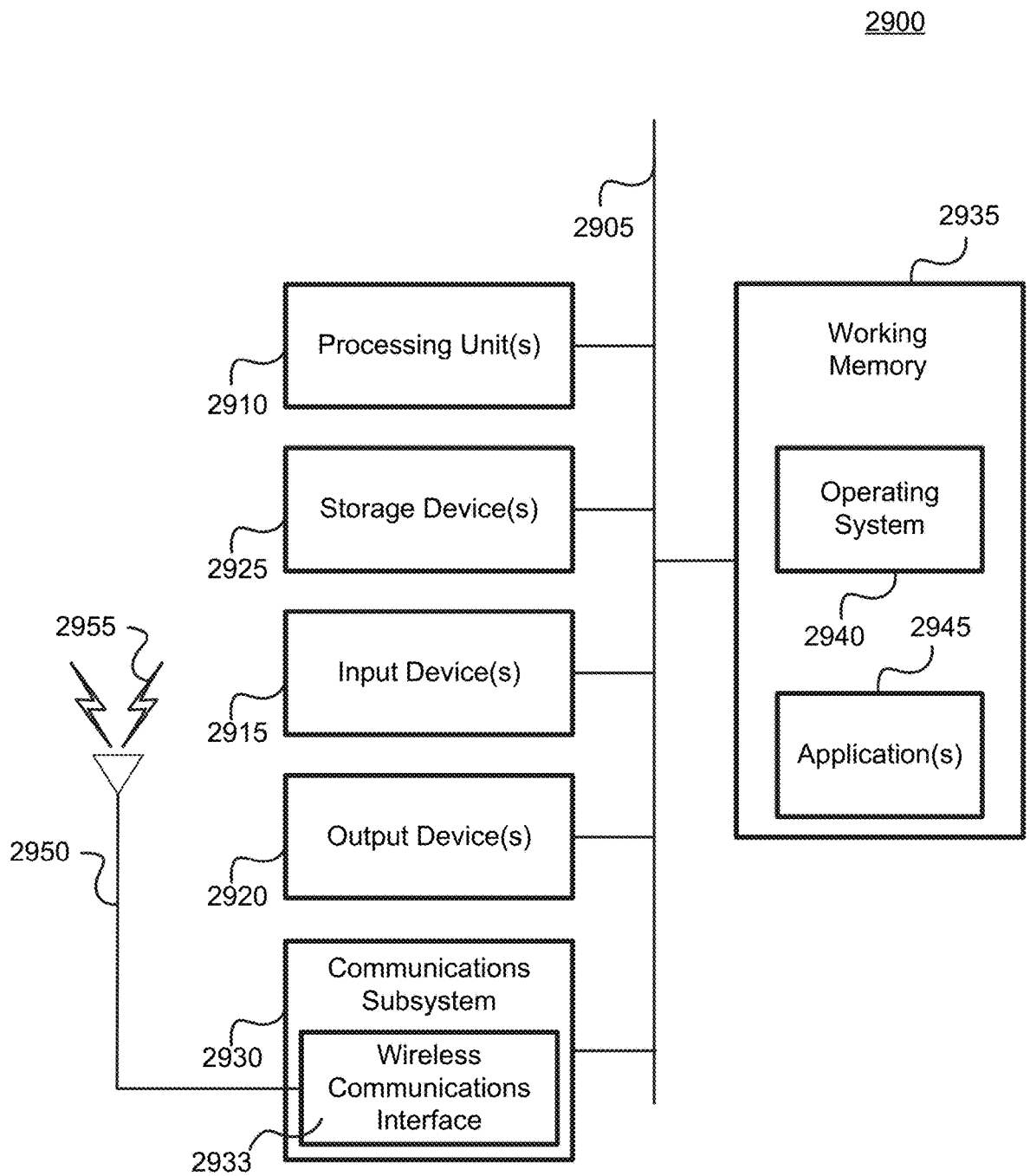
FIG. 29 is a block diagram of an embodiment of a computer system, which may be used, in whole or in part, to provide the functions of one or more network components.

FIG. 29 is a block diagram of an embodiment of a computer system 2900, which may be used, in whole or in part, to provide the functions of one or more network components as described in the embodiments herein (e.g., radar server 2660 of FIG. 26). It should be noted that FIG. 29 is meant only to provide a generalized illustration of various components, any or all of which may be utilized as appropriate. FIG. 29, therefore, broadly illustrates how individual system elements may be implemented in a relatively separated or relatively more integrated manner. In addition, it can be noted that components illustrated by FIG. 29 can be localized to a single device and/or distributed among various networked devices, which may be disposed at different geographical locations.

The computer system 2900 is shown comprising hardware elements that can be electrically coupled via a bus 2905 (or may otherwise be in communication, as appropriate). The hardware elements may include processing unit(s) 2910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 2900 also may comprise one or more input devices 2915, which may comprise without limitation a mouse, a keyboard, a camera, a microphone, and/or the like; and one or more output devices 2920, which may comprise without limitation a display device, a printer, and/or the like.

The computer system 2900 may further include (and/or be in communication with) one or more non-transitory storage devices 2925, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 2900 may also include a communications subsystem 2930, which may comprise wireless communication technologies managed and controlled by a wireless communication interface 2933, as well as wired technologies (such as Ethernet, coaxial communications, universal serial bus (USB), and the like). The wireless communication interface 2933 may send and receive wireless signals 2955 (e.g., signals according to 5G NR or LTE) via wireless antenna(s) 2950. Thus the communications subsystem 2930 may comprise a modem, a network card (wireless or wired), an infrared communication device, a wireless communication device, and/or a chipset, and/or the like, which may enable the computer system 2900 to communicate on any or all of the communication networks described herein to any device on the respective network, including a User Equipment (UE), base stations and/or other TRPs, and/or any other electronic devices described herein. Hence, the communications subsystem 2930 may be used to receive and send data as described in the embodiments herein.

In many embodiments, the computer system 2900 will further comprise a working memory 2935, which may comprise a RAM or ROM device, as described above. Software elements, shown as being located within the working memory 2935, may comprise an operating system 2940, device drivers, executable libraries, and/or other code, such as one or more applications 2945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 2925 described above. In some cases, the storage medium might be incorporated within a computer system, such as computer system 2900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 2900 and/or might take the form of source and/or installable code, which, upon compilation and/or installation on the computer system 2900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for radar sensing comprising: providing, from a radar server, one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target; and receiving, at the radar server from the second wireless communications system TRP, one or more measurement reports containing one or more of delay, Doppler frequency, and/or angle-of-arrival information based on reception of the echo signal at the second wireless communications system TRP, wherein the first wireless communications system TRP and the second wireless communications system TRP are part of a cellular communications system.

Clause 2. The method of clause 1, wherein the one or more measurement reports comprise a bundled report corresponding to one or more detected targets.

Clause 3. The method of clause 1 or 2, further comprising: sending, from the radar server to the second wireless communications system TRP, feedback information to enhance target detection performance of the second wireless communications system TRP.

Clause 4. The method of clause 2 or 3, wherein the bundled report comprises, for each of the one or more detected targets, a time difference measurement corresponding to a difference between (1) a time of reception of the echo signal and (2) a time of reception of a line-of-sight (LOS) signal from the first wireless communications system TRP.

Clause 5. The method of any of clauses 2-4, wherein the bundled report comprises, for each of the one or more detected targets, an angle-of-arrival (AoA) estimation angle, a delay measurement, and/or a Doppler shift measurement.

Clause 6. The method of clause 5, wherein at least one of the AoA estimation angle, the delay measurement, or the Doppler shift measurement is represented in the bundled report as a sequence of difference values over time for the one or more detected targets.

Clause 7. The method of clause 5 or 6, further comprising: sending, from the radar server to the second wireless communications system TRP, an instruction identifying at least one of the one or more detected targets as selected targets, and wherein the bundled report comprises the AoA estimation angle, the delay measurement, and/or the Doppler shift measurement for each of the selected targets.

Clause 8. The method of any of clauses 5-7, wherein at least one of the AoA estimation angle, the delay measurement, or the Doppler shift measurement is represented in the bundled report as a sequence of difference values over time for the one or more selected targets.

Clause 9. The method of any of clauses 1-8, wherein the one or more measurement reports comprise a quantized delay/Doppler power profile report containing power values corresponding to a two-dimensional grid of delay bins and Doppler frequency bins.

Clause 10. The method of clause 9, wherein power values in the quantized delay/Doppler power profile report are represented as a sequence of difference values over time, subsequent to an initial report.

Clause 11. The method of any of clauses 1-8 wherein the one or more measurement reports comprise a quantized AoA/delay power profile report containing power values corresponding to a two-dimensional grid of AoA bins and delay bins.

Clause 12. The method of clause 11, wherein power values in the quantized AoA/delay power profile report are represented as a sequence of difference values over time, subsequent to an initial report.

Clause 13. The method of any of clauses 1-8, wherein the one or more measurement reports comprise a quantized AoA/Doppler power profile report containing power values corresponding to a two-dimensional grid of AoA bins and Doppler bins.

Clause 14. The method of clause 13, wherein power values in the quantized AoA/Doppler power profile report are represented as a sequence of difference values over time, subsequent to an initial report.

Clause 15. The method of any of clauses 1-8, wherein the one or more measurement reports comprise a quantized AoA/delay/Doppler power profile report containing power values corresponding to a three-dimensional grid of AoA bins, delay bins, and Doppler bins.

Clause 16. The method of clause 15, wherein power values in the quantized AoA/delay/Doppler power profile report are represented as a sequence of difference values over time, subsequent to an initial report.

Clause 17. The method of any of clauses 1-16, wherein the cellular communications system conforms to 5G standard introduced in the release 15 version of the 3rd Generation Partnership Project (3GPP) specifications.

Clause 18. The method of any of clauses 1-17, wherein each of the first wireless communications system TRP and the second wireless communications system TRP is a gNodeB within the cellular communications system.

Clause 19. A method for radar sensing comprising: receiving, from a radar server, one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target; and providing, from the second wireless communications system TRP, one or more measurement reports containing one or more of delay, Doppler frequency, and/or angle-of-arrival information based on reception of the echo signal at the second wireless communications system TRP, wherein the first wireless communications system TRP and the second wireless communications system TRP are part of a cellular communications system.

Clause 20. The method of clause 19, wherein the one or more measurement reports comprise a bundled report corresponding to one or more detected targets.

Clause 21. The method of clause 19 or 20, further comprising: receiving, at the second wireless communications system TRP from the radar server, feedback information to enhance target detection performance of the second wireless communications system TRP.

Clause 22. The method of clause 20 or 21, wherein the bundled report comprises, for each of the one or more detected targets, a time difference measurement corresponding to a difference between (1) a time of reception of the echo signal and (2) a time of reception of a line-of-sight (LOS) signal from the first wireless communications system TRP.

Clause 23. The method of any of clauses 20-22, wherein the bundled report comprises, for each of the one or more detected targets, an angle-of-arrival (AoA) estimation angle, a delay measurement, and/or a Doppler shift measurement.

Clause 24. The method of clause 23, wherein at least one of the AoA estimation angle, the delay measurement, or the Doppler shift measurement is represented in the bundled report as a sequence of difference values over time for the one or more detected targets.

Clause 25. The method of clause 23 or 24, further comprising: receiving, at the second wireless communications system TRP from the radar server, an instruction identifying at least one of the one or more detected targets as selected targets, and wherein the bundled report comprises the AoA estimation angle, the delay measurement, and/or the Doppler shift measurement for each of the selected targets.

Clause 26. A radar system comprising: a radar server configured to provide one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target, wherein: the radar server is further configured to receive, from the second wireless communications system TRP, one or more measurement reports containing one or more of delay, Doppler frequency, and/or angle-of-arrival information based on reception of the echo signal at the second wireless communications system TRP, and the first wireless communications system TRP and the second wireless communications system TRP are part of a cellular communications system.

Clause 27. The radar system of clause 26, wherein the one or more measurement reports comprise a bundled report corresponding to one or more detected targets.

Clause 28. The radar system of clause 27, wherein the bundled report comprises, for each of the one or more detected targets, a time difference measurement corresponding to a difference between (1) a time of reception of the echo signal and (2) a time of reception of a line-of-sight (LOS) signal from the first wireless communications system TRP.

Clause 29. The radar system of any of clause 26-28, wherein the one or more measurement reports comprise, for each of the one or more detected targets, an angle-of-arrival (AoA) estimation angle, a delay measurement, and/or a Doppler shift measurement.

Clause 30. A non-transitory computer-readable medium storing instructions therein for execution by one or more processing units, comprising instructions to: provide, from a radar server, one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target; and receive, at the radar server from the second wireless communications system TRP, one or more measurement reports containing one or more of delay, Doppler frequency, and/or angle-of-arrival information based on reception of the echo signal at the second wireless communications system TRP, wherein the first wireless communications system TRP and the second wireless communications system TRP are part of a cellular communications system.

What is claimed is:

1. A method for radar sensing comprising:
providing, from a radar server, one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target;
receiving, at the radar server from the second wireless communications system TRP, one or more measurement reports containing one or more of delay, Doppler frequency, and/or angle-of-arrival information based on reception of the echo signal at the second wireless communications system TRP; and
sending, from the radar server to the second wireless communications system TRP, feedback information to enhance target detection performance of the second wireless communications system TRP, the feedback information comprising i) a transmission and reception timing between the first wireless communications TRP and the second wireless communications system TRP, ii) direction and patterns of beams between the first wireless communications TRP and the second wireless communications system TRP, or iii) configuration parameters for focusing on certain points or regions of interested based on prior detection events, known landmarks, or known obstructions;
wherein the first wireless communications system TRP and the second wireless communications system TRP are part of a cellular communications system.

2. The method of claim 1, wherein the one or more measurement reports comprise a bundled report corresponding to one or more detected targets.

3. The method of claim 2, wherein the bundled report comprises, for each of the one or more detected targets, a time difference measurement corresponding to a difference between (1) a time of reception of the echo signal and (2) a time of reception of a line-of-sight (LOS) signal from the first wireless communications system TRP.

4. The method of claim 2, wherein the bundled report comprises, for each of the one or more detected targets, an angle-of-arrival (AoA) estimation angle, a delay measurement, and/or a Doppler shift measurement.

5. The method of claim 4, wherein at least one of the AoA estimation angle, the delay measurement, or the Doppler shift measurement is represented in the bundled report as a sequence of difference values over time for the one or more detected targets.

6. The method of claim 4, further comprising:
sending, from the radar server to the second wireless communications system TRP, an instruction identifying at least one of the one or more detected targets as selected targets, and wherein the bundled report comprises the AoA estimation angle, the delay measurement, and/or the Doppler shift measurement for each of the selected targets.

7. The method of claim 6, wherein at least one of the AoA estimation angle, the delay measurement, or the Doppler shift measurement is represented in the bundled report as a sequence of difference values over time for the one or more selected targets.

8. The method of claim 1, wherein the one or more measurement reports comprise a quantized delay/Doppler power profile report containing power values corresponding to a two-dimensional grid of delay bins and Doppler frequency bins.

9. The method of claim 8, wherein power values in the quantized delay/Doppler power profile report are represented as a sequence of difference values over time, subsequent to an initial report.

10. The method of claim 1, wherein the one or more measurement reports comprise a quantized AoA/delay power profile report containing power values corresponding to a two-dimensional grid of AoA bins and delay bins.

11. The method of claim 10, wherein power values in the quantized AoA/delay power profile report are represented as a sequence of difference values over time, subsequent to an initial report.

12. The method of claim 1, wherein the one or more measurement reports comprise a quantized AoA/Doppler power profile report containing power values corresponding to a two-dimensional grid of AoA bins and Doppler bins.

13. The method of claim 12, wherein power values in the quantized AoA/Doppler power profile report are represented as a sequence of difference values over time, subsequent to an initial report.

14. The method of claim 1, wherein the one or more measurement reports comprise a quantized AoA/delay/Doppler power profile report containing power values corresponding to a three-dimensional grid of AoA bins, delay bins, and Doppler bins.

15. The method of claim 14, wherein power values in the quantized AoA/delay/Doppler power profile report are represented as a sequence of difference values over time, subsequent to an initial report.

16. The method of claim 1, wherein the cellular communications system conforms to 5G standard introduced in the release 15 version of 3rd Generation Partnership Project (3GPP) specifications.

17. The method of claim 16, wherein each of the first wireless communications system TRP and the second wireless communications system TRP is a gNodeB within the cellular communications system.

18. A method for radar sensing comprising:
receiving, from a radar server, one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target;
providing, from the second wireless communications system TRP, one or more measurement reports containing one or more of delay, Doppler frequency, and/or angle-of-arrival information based on reception of the echo signal at the second wireless communications system TRP; and
receiving, at the second wireless communications system TRP from the radar server, feedback information to enhance target detection performance of the second wireless communications system TRP, the feedback information comprising i) a transmission and reception timing between the first wireless communications TRP and the second wireless communications system TRP, ii) direction and patterns of beams between the first wireless communications TRP and the second wireless communications system TRP, or iii) configuration parameters for focusing on certain points or regions of interested based on prior detection events, known landmarks, or known obstructions;

wherein the first wireless communications system TRP and the second wireless communications system TRP are part of a cellular communications system.

19. The method of claim 18, wherein the one or more measurement reports comprise a bundled report corresponding to one or more detected targets.

20. The method of claim 19, wherein the bundled report comprises, for each of the one or more detected targets, a time difference measurement corresponding to a difference between (1) a time of reception of the echo signal and (2) a time of reception of a line-of-sight (LOS) signal from the first wireless communications system TRP.

21. The method of claim 19, wherein the bundled report comprises, for each of the one or more detected targets, an angle-of-arrival (AoA) estimation angle, a delay measurement, and/or a Doppler shift measurement.

22. The method of claim 21, wherein at least one of the AoA estimation angle, the delay measurement, or the Doppler shift measurement is represented in the bundled report as a sequence of difference values over time for the one or more detected targets.

23. The method of claim 19, further comprising:
receiving, at the second wireless communications system TRP from the radar server, an instruction identifying at least one of the one or more detected targets as selected targets, and wherein the bundled report comprises the AoA estimation angle, the delay measurement, and/or the Doppler shift measurement for each of the selected targets.

24. A radar system comprising:
a radar server configured to provide one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target, wherein:
the radar server is further configured to receive, from the second wireless communications system TRP, one or more measurement reports containing one or more of delay, Doppler frequency, and/or angle-of-arrival information based on reception of the echo signal at the second wireless communications system TRP;
the radar server is further configured to send, to the second wireless communications system TRP, feedback information to enhance target detection performance of the second wireless communications system TRP, the feedback information comprising i) a transmission and reception timing between the first wireless communications TRP and the second wireless communications system TRP, ii) direction and patterns of beams between the first wireless communications TRP and the second wireless communications system TRP, or iii) configuration parameters for focusing on certain points or regions of interested based on prior detection events, known landmarks, or known obstructions;

wherein the first wireless communications system TRP and the second wireless communications system TRP are part of a cellular communications system.

25. The radar system of claim 24, wherein the one or more measurement reports comprise a bundled report corresponding to one or more detected targets.

26. The radar system of claim 25, wherein the bundled report comprises, for each of the one or more detected targets, a time difference measurement corresponding to a difference between (1) a time of reception of the echo signal and (2) a time of reception of a line-of-sight (LOS) signal from the first wireless communications system TRP.

27. The radar system of claim 25, wherein the one or more measurement reports comprise, for each of the one or more detected targets, an angle-of-arrival (AoA) estimation angle, a delay measurement, and/or a Doppler shift measurement.

28. A non-transitory computer-readable medium storing instructions therein for execution by one or more processing units, comprising instructions to:
provide, from a radar server, one or more parameters for configuring a first wireless communications system Transmission Reception Point (TRP) as a transmitter for sending a transmit signal and configuring a second wireless communications system TRP as a receiver for receiving an echo signal corresponding to a reflection of the transmit signal from a target;
receive, at the radar server from the second wireless communications system TRP, one or more measurement reports containing one or more of delay, Doppler frequency, and/or angle-of-arrival information based on reception of the echo signal at the second wireless communications system TRP; and
send, from the radar server, to the second wireless communications system TRP, feedback information to enhance target detection performance of the second wireless communications system TRP, the feedback information comprising i) a transmission and reception timing between the first wireless communications TRP and the second wireless communications system TRP, ii) direction and patterns of beams between the first wireless communications TRP and the second wireless communications system TRP, or iii) configuration parameters for focusing on certain points or regions of interested based on prior detection events, known landmarks, or known obstructions;
wherein the first wireless communications system TRP and the second wireless communications system TRP are part of a cellular communications system.

* * * * *